US010417556B1

(12) United States Patent
Fairbank et al.

(10) Patent No.: US 10,417,556 B1
(45) Date of Patent: Sep. 17, 2019

(54) SIMULATION-BASED CONTROLS OPTIMIZATION USING TIME SERIES DATA FORECAST

(71) Applicant: HatchB Labs, Inc., McLean, VA (US)

(72) Inventors: Carl Fairbank, McLean, VA (US); Benjamin Lindquist, Falls Church, VA (US); M. Firoze Lafeer, Fairfax, VA (US); Douglas Lanzo, Chevy Chase, MD (US); Richard Snyder, Vienna, VA (US); Vijay Chakilam, Brambelton, VA (US)

(73) Assignee: HatchB Labs, Inc., McLean, VA (US)

( * ) Notice: Subject to any disclaimer, the term of this patent is extended or adjusted under 35 U.S.C. 154(b) by 0 days.

(21) Appl. No.: 16/213,199

(22) Filed: Dec. 7, 2018

Related U.S. Application Data

(60) Provisional application No. 62/595,786, filed on Dec. 7, 2017.

(51) Int. Cl.
*G06N 3/04* (2006.01)
*G06Q 40/02* (2012.01)
*G06N 3/08* (2006.01)

(52) U.S. Cl.
CPC ............... *G06N 3/04* (2013.01); *G06N 3/08* (2013.01); *G06Q 40/025* (2013.01)

(58) Field of Classification Search
None
See application file for complete search history.

(56) References Cited

U.S. PATENT DOCUMENTS

| | | | |
|---|---|---|---|
| 6,418,378 B1 * | 7/2002 | Nyland | G01V 1/3835 702/14 |
| 10,036,328 B2 * | 7/2018 | Brummel | G05B 13/027 |
| 2017/0213132 A1 * | 7/2017 | Hammond | G06F 8/31 |
| 2018/0032864 A1 * | 2/2018 | Graepel | G06N 3/0427 |
| 2018/0356793 A1 * | 12/2018 | Kanemaru | G05B 19/4083 |
| 2019/0012581 A1 * | 1/2019 | Honkala | G06K 9/6212 |
| 2019/0130232 A1 * | 5/2019 | Kaasila | G06N 20/00 |

* cited by examiner

*Primary Examiner* — Paulinho E Smith
(74) *Attorney, Agent, or Firm* — Potomac Law Group, PLLC

(57) ABSTRACT

A trained neural network that is configured to generate predictions for periods of time in the future based on input data can be received, where the neural network is trained using training data that includes time series data segmented into windows. Observed time series data can be processed to generate the input data. Using the trained neural network and the generated input data, data predictions can be generated. The predictions can be provided to a reinforcement learning model configured to generate predicted outcomes, where the reinforcement learning model varies parameters to simulate conditions for a first and second entity, and an artificial intelligence agent simulates actions performed by one of the first and second entities, the data predictions being a parameter for the simulation. Parameters for the first and second entities can be selected, where the selected parameters correspond to a predicted outcome that meets a criteria.

30 Claims, 25 Drawing Sheets

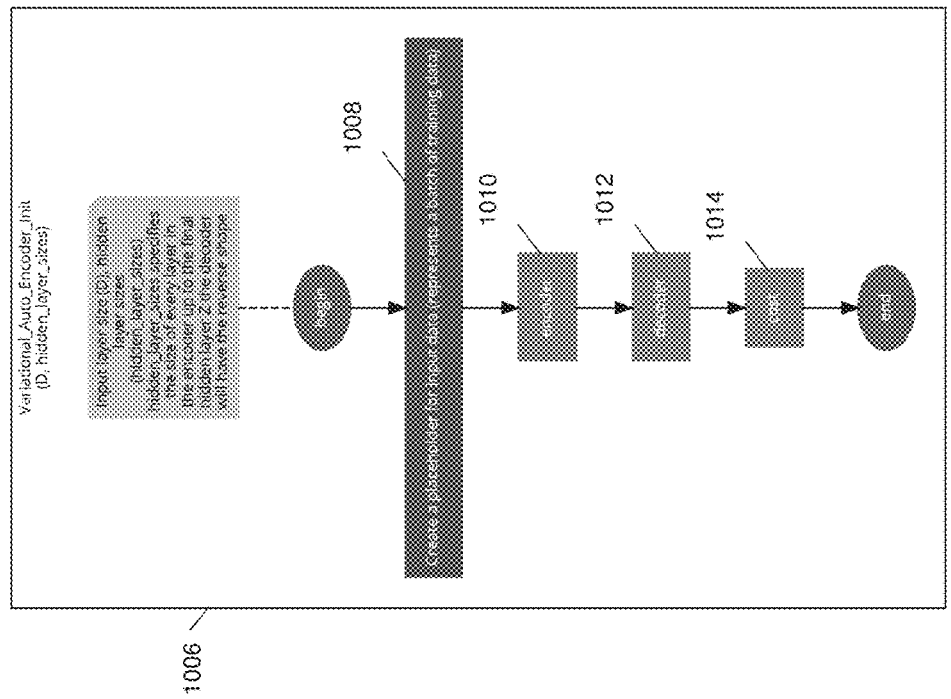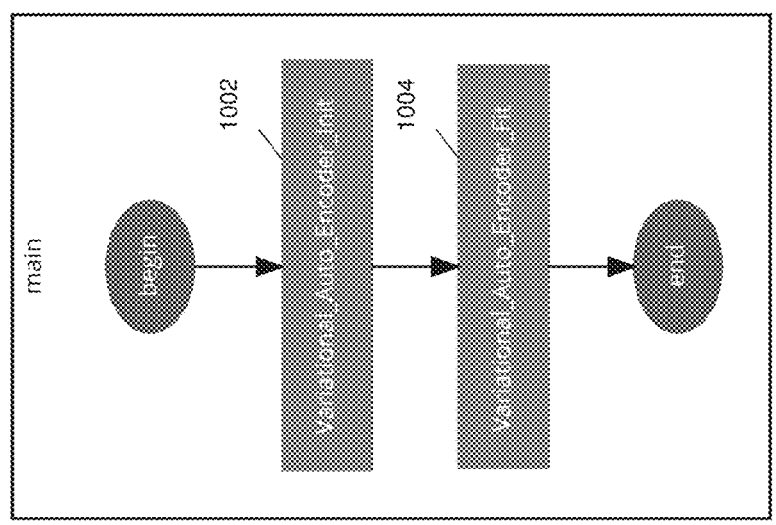
Fig. 10

| timestamp | type | source_type | source_id | dest_type | dest_id | amt | ref_id |
|---|---|---|---|---|---|---|---|
| 2015-01-01 15:01:01 | invoice | merchant | | payor | 1 | 139203.08 | 1 |
| 2015-01-01 15:31:01 | advance | factor | | merchant | 1 | 111362.46 | 1 |
| 2015-01-06 15:01:01 | payment | payor | | lockbox | 2 | 139203.08 | 1 |
| 2015-01-10 15:01:01 | repay_adv | lockbox | | factor | 1 | 111362.46 | 1 |
| 2015-01-11 15:01:01 | pay_fee | lockbox | | factor | 1 | 4176.09 | 1 |
| 2015-01-01 13:01:01 | invoice | merchant | | payor | 1 | 150739.34 | 2 |
| 2015-01-01 13:31:01 | advance | factor | | merchant | 1 | 120591.48 | 2 |
| 2015-01-08 13:01:01 | payment | payor | | lockbox | 2 | 150739.34 | 2 |
| 2015-01-10 13:01:01 | repay_adv | lockbox | | factor | 1 | 120591.48 | 2 |
| 2015-01-11 13:01:01 | pay_fee | lockbox | | factor | 1 | 4522.18 | 2 |
| 2015-01-01 16:01:01 | invoice | merchant | | payor | 1 | 74778.63 | 3 |
| 2015-01-01 16:31:01 | advance | factor | | merchant | 1 | 59822.91 | 3 |
| 2015-01-01 16:01:01 | payment | payor | | lockbox | 3 | 74778.63 | 3 |
| 2015-01-10 16:01:01 | repay_adv | lockbox | | factor | 1 | 59822.91 | 3 |
| 2015-01-11 16:01:01 | pay_fee | lockbox | | factor | 1 | 2243.36 | 3 |
| 2015-01-01 9:01:01 | invoice | merchant | | payor | 1 | 70932.98 | 4 |
| 2015-01-01 9:31:01 | advance | factor | | merchant | 1 | 56746.38 | 4 |
| 2015-01-08 9:01:01 | payment | payor | | lockbox | 3 | 70932.98 | 4 |
| 2015-01-10 9:01:01 | repay_adv | lockbox | | factor | 1 | 56746.38 | 4 |

| timestamp | type | source_type | source_id | dest_type | dest_id | amt | ref_id | date |
|---|---|---|---|---|---|---|---|---|
| 2015-01-01 5:01:01 | invoice | merchant | 1 | payor | 8 | 13701.42 | 9 | 1/1/2015 |
| 2015-01-01 5:01:01 | invoice | merchant | 1 | payor | 18 | 4281.11 | 18 | 1/1/2015 |
| 2015-01-01 5:31:01 | advance | factor | 1 | merchant | 1 | 109809.13 | 9 | 1/1/2015 |
| 2015-01-01 5:31:01 | advance | factor | 1 | merchant | 1 | 34246.88 | 18 | 1/1/2015 |
| 2015-01-01 6:01:01 | invoice | merchant | 1 | payor | 17 | 24761.57 | 17 | 1/1/2015 |
| 2015-01-01 6:31:01 | advance | factor | 1 | merchant | 1 | 198089.25 | 17 | 1/1/2015 |
| 2015-01-01 7:01:01 | invoice | merchant | 1 | payor | 12 | 116195.54 | 12 | 1/1/2015 |
| 2015-01-01 7:01:01 | invoice | merchant | 1 | payor | 19 | 181980.25 | 20 | 1/1/2015 |
| 2015-01-01 7:31:01 | advance | factor | 1 | merchant | 1 | 92956.43 | 12 | 1/1/2015 |
| 2015-01-01 7:31:01 | advance | factor | 1 | merchant | 1 | 145584.2 | 20 | 1/1/2015 |
| 2015-01-01 8:01:01 | invoice | merchant | 1 | payor | 9 | 151594.36 | 10 | 1/1/2015 |
| 2015-01-01 8:31:01 | advance | factor | 1 | merchant | 1 | 121275.49 | 10 | 1/1/2015 |
| 2015-01-01 9:01:01 | invoice | merchant | 1 | payor | 3 | 70932.98 | 4 | 1/1/2015 |
| 2015-01-01 9:31:01 | advance | factor | 1 | merchant | 1 | 56746.36 | 4 | 1/1/2015 |
| 2015-01-01 10:01:01 | invoice | merchant | 1 | payor | 18 | 212890.32 | 19 | 1/1/2015 |
| 2015-01-01 10:31:01 | advance | factor | 1 | merchant | 1 | 170312.26 | 19 | 1/1/2015 |
| 2015-01-01 11:01:01 | invoice | merchant | 1 | payor | 6 | 125087.93 | 7 | 1/1/2015 |
| 2015-01-01 11:01:01 | invoice | merchant | 1 | payor | 9 | 222785.6 | 11 | 1/1/2015 |
| 2015-01-01 11:31:01 | advance | factor | 1 | merchant | 1 | 100070.35 | 7 | 1/1/2015 |
| 2015-01-01 11:31:01 | advance | factor | 1 | merchant | 1 | 178228.64 | 11 | 1/1/2015 |

Fig. 21

| date | amt_advanced | pmt_received | amt_invoiced | advances_repaid | fees_paid | reserve_paid |
|---|---|---|---|---|---|---|
| 1/1/2015 | 0.00 | 0.00 | 137,011.42 | 0.00 | 0.00 | 0.00 |
| 1/1/2015 | 0.00 | 0.00 | 42,811.10 | 0.00 | 0.00 | 0.00 |
| 1/1/2015 | 109,609.13 | 0.00 | 0.00 | 0.00 | 0.00 | 0.00 |
| 1/1/2015 | 34,248.88 | 0.00 | 0.00 | 0.00 | 0.00 | 0.00 |
| 1/1/2015 | 0.00 | 0.00 | 247,611.57 | 0.00 | 0.00 | 0.00 |
| 1/1/2015 | 198,089.25 | 0.00 | 0.00 | 0.00 | 0.00 | 0.00 |
| 1/1/2015 | 0.00 | 0.00 | 116,195.54 | 0.00 | 0.00 | 0.00 |
| 1/1/2015 | 0.00 | 0.00 | 181,980.25 | 0.00 | 0.00 | 0.00 |
| 1/1/2015 | 92,956.43 | 0.00 | 0.00 | 0.00 | 0.00 | 0.00 |
| 1/1/2015 | 145,584.20 | 0.00 | 0.00 | 0.00 | 0.00 | 0.00 |
| 1/1/2015 | 0.00 | 0.00 | 151,594.36 | 0.00 | 0.00 | 0.00 |
| 1/1/2015 | 121,275.49 | 0.00 | 0.00 | 0.00 | 0.00 | 0.00 |
| 1/1/2015 | 0.00 | 0.00 | 70,932.98 | 0.00 | 0.00 | 0.00 |
| 1/1/2015 | 56,746.38 | 0.00 | 0.00 | 0.00 | 0.00 | 0.00 |
| 1/1/2015 | 0.00 | 0.00 | 212,890.32 | 0.00 | 0.00 | 0.00 |

SIMULATION-BASED CONTROLS OPTIMIZATION USING TIME SERIES DATA FORECAST

PRIORITY

This application claims priority of U.S. Provisional Patent Application No. 62/595,786, filed on Dec. 7, 2017, the disclosure of which is hereby incorporated by reference.

FIELD

The embodiments of the present disclosure generally relate to generating time series data predictions used to determine parameters by a reinforcement learning model.

BACKGROUND

Machine prediction has provided a number of tangible benefits in the modern computing environment. For example, learning models, such as neural networks, can be trained to identify trends in data that can be leveraged for a variety of benefits. In addition, other forms of artificial intelligence, such as reinforcement learning models, can accomplish machine optimization based on how these models are configured. However, the effectiveness of artificial intelligence systems is still dependent on configuration and the manner in which these systems are deployed. This is particularly apparent when different forms of artificial intelligence models are stacked. For example, some implementations may result in poor prediction or optimization based on, for example, the training data used, the structure of an implemented neural network, the configuration of a reinforcement learning model, and/or a lack of synergy between the different stacked layers. Accordingly, an artificial intelligence system that can effectively stack different machine learning models to realize synergies between machine prediction and optimization can provide an improved computing tool.

SUMMARY

The embodiments of the present disclosure are generally directed to systems and methods for generating time series data predictions used to determine parameters by a reinforcement learning model that substantially improve upon the related art.

A trained neural network that is configured to generate a plurality of predictions for a plurality of periods of time in the future based on input data can be received, where the neural network is trained using training data that includes time series data segmented into a plurality of windows. Observed time series data can be processed to generate the input data. Using the trained neural network and the generated input data, a plurality of data predictions for the plurality of periods of time in the future can be generated. The plurality of predictions can be provided to a reinforcement learning model configured to generate a plurality of predicted outcomes, where the reinforcement learning model varies a plurality of parameters to simulate conditions for at least a first entity and a second entity, and an artificial intelligence agent simulates actions performed by one or more of the first entity and second entity, the plurality of data predictions being a parameter for the simulation. Parameters for the first and second entities can be selected based on the plurality of predicted outcomes, where the selected parameters correspond to one of the predicted outcomes that meets a selection criteria.

Features and advantages of the embodiments are set forth in the description which follows, or will be apparent from such description, or may be learned by practice of the disclosure.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 10 illustrates a flow diagram for initializing a variational auto-encoder according to an example embodiment.

FIGS. 20-24 illustrates data structures implemented with a variational auto-encoder according to an example embodiment.

DETAILED DESCRIPTION

Figure 1:
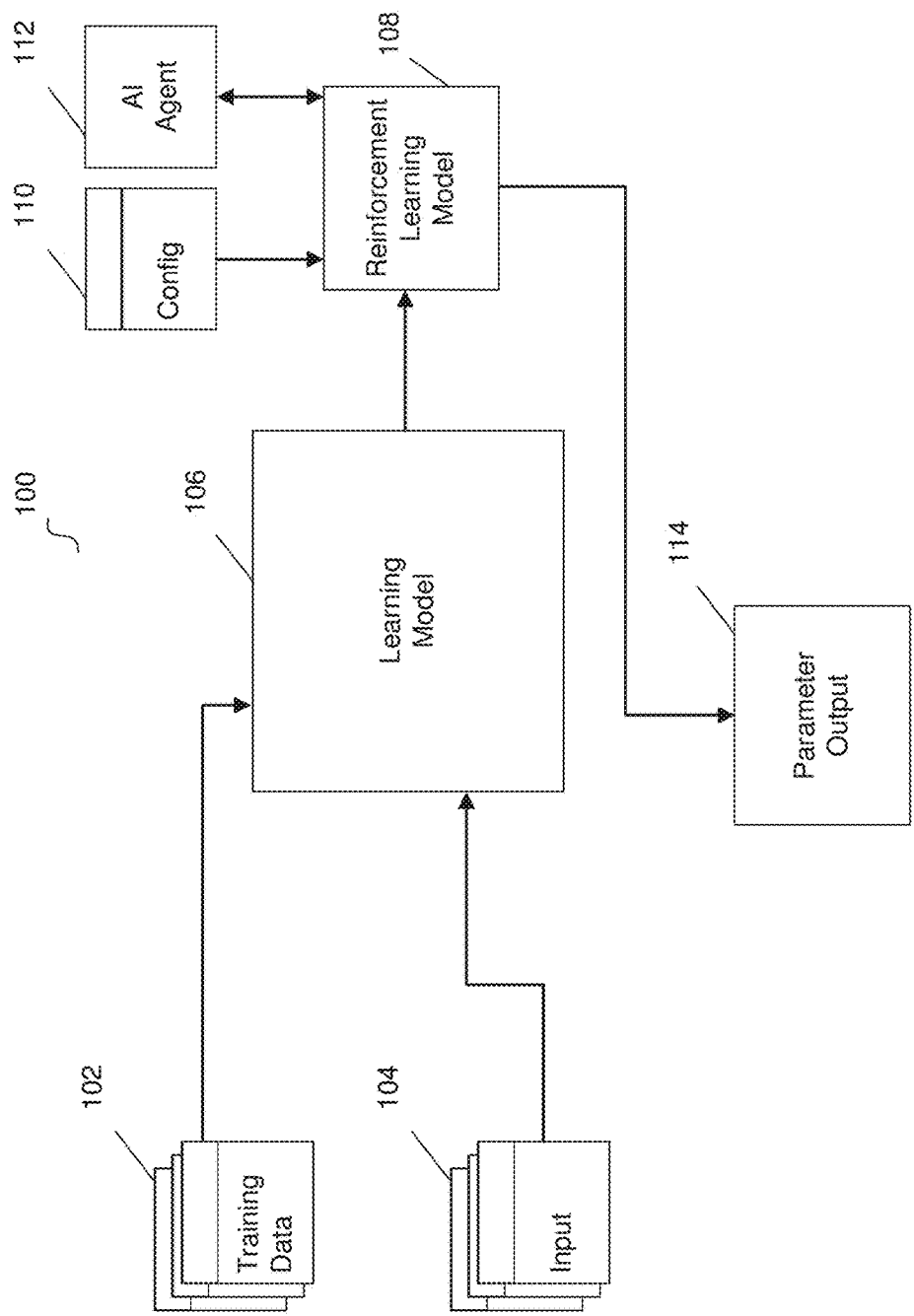
FIG. 1 illustrates a system for generating time series data predictions used to determine parameters by a reinforcement learning model according to an example embodiment.

Embodiments generate time series data predictions used to determine parameters by a reinforcement learning model. In some embodiments, a learning model, such as a neural network, can be used in combination with a reinforcement learning model to perform machine prediction of time series data that is then utilized to optimize one or more given parameters. For example, a learning model, such as a neural network, can be trained using time series data to generate time series predictions. In some embodiments, the training data can be past time series data that has been observed and the learning model can be trained to predict time series data for the future.

Embodiments can feed this predicted time series data into a reinforcement learning model that has been configured to optimize one or more parameters. For example, the reinforcement learning model can be configured to simulate a plurality of outcomes based on variations to a set of parameters and a defined reward function. The predicted time series data can be an input to the reinforcement learning model, and the agent can iterate over a number of steps with varied parameters to generate predicted outcomes with corresponding reward values.

In some embodiments, the time series data can include transactions for a merchant. For example, a merchant can experience a number of transactions observed over time, such as an invoice billed to a payor from the merchant, payment of such an invoice, a cash advance provided from an entity, such as a factor, to the merchant, repayment of the advance, and the like. In an embodiment, the merchant may be a party to an agreement, such as a lending agreement with a lender and a factor. For example, the agreement can be based on an account, or a lockbox, where the factor manages the release of funds to the lender and/or the merchant from the lockbox. In some embodiments, the funds in the lockbox increase when a payor of the merchant pays an invoice. Funds can then be released from the lockbox to the merchant when certain obligations to the lender are met, such as satisfying a payment schedule for a loan, and/or once fee or other payment obligations to the factor have been met. In addition, a demand can also be submitted that releases funds from the lockbox to the lender when these obligations are not met, such as when a merchant is delinquent on a loan.

In some embodiments, the learning model (e.g., neural network) can be trained using time series data that represents transactions for a given merchant over time and a balance for the lockbox over time. The learning model can then generate predictions for a balance of the lockbox over time, for example based on expected transaction activity for the merchant given the historical transaction data. In some embodiments, the lockbox balance can be predicted on a day by day basis over a defined number of days in the future. In other words, time series data that includes a lockbox balance over a number of days can be predicted.

Embodiments can then feed this predicted daily lockbox balance into the reinforcement learning model, which can be a Q-learning model, or any other suitable reinforcement learning model. The reinforcement learning model can be configured to simulate various conditions for the lending agreement, such as various payment schedules, the amount of the loan, the aggregate amount of the loan facility, the draw schedule, maximum draw amounts, the loan term, the timing for a demand, the likelihood of repayment by the merchant given the other conditions, expected recoupment on the loan by the lender given the other conditions, and the like. The reinforcement learning model can vary one or more of these parameters to optimize an objective, such as a defined reward function. In some embodiments, the reinforcement learning model can iterate through steps of the simulation, taking as input the predicted time series data. The result can generate parameters for the relationship between the parties of the agreement, and parameters can be selected that meet a selection criteria, such as an optimized reward function.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

FIG. 1 illustrates a system for generating time series data predictions used to determine parameters by a reinforcement learning model according to an example embodiment. System 100 includes training data 102, input 104, learning model 106, reinforcement learning model 108, configuration data 110, artificial intelligence agent 112, and parameter output 114. In some embodiments, learning model 106 can be used to generate time series predictions based on time series training data 102 and input data 104, where these predictions are input into reinforcement learning model 108. Reinforcement learning model 108 can be configured by configuration 110, where the reinforcement learning model can simulate conditions according to the generated time series predictions and artificial intelligence agent 112. For example, artificial intelligence agent 112 can iterate over multiple steps of the simulation to arrive at parameters that optimize a defined reward function, which can be output as output parameters 114. In an embodiment, reinforcement learning model 108 can include artificial intelligence agent 112.

Figure 2:
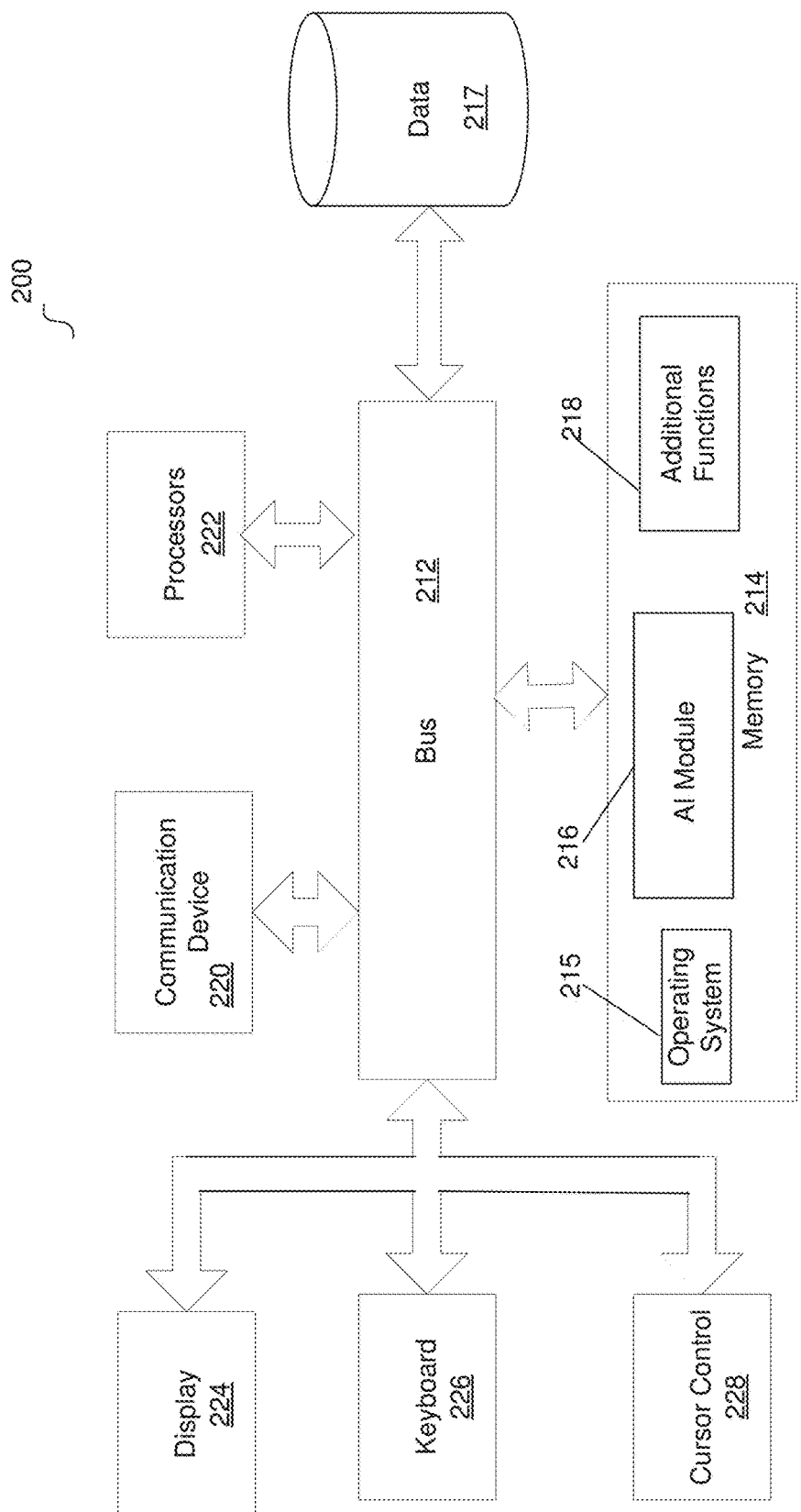
FIG. 2 illustrates a block diagram of a computing device operatively coupled to a system according to an example embodiment.

FIG. 2 is a block diagram of a computer server/system 200 in accordance with embodiments. All or portions of system 200 may be used to implement any of the elements shown in FIG. 1. As shown in FIG. 2, system 200 may include a bus device 212 and/or other communication mechanism(s) configured to communicate information between the various components of system 200, such as processor 222 and memory 214. In addition, communication device 220 may enable connectivity between processor 222 and other devices by encoding data to be sent from processor 222 to another device over a network (not shown) and decoding data received from another system over the network for processor 222.

For example, communication device 220 may include a network interface card that is configured to provide wireless network communications. A variety of wireless communication techniques may be used including infrared, radio, Bluetooth®, Wi-Fi, and/or cellular communications. Alternatively, communication device 220 may be configured to provide wired network connection(s), such as an Ethernet connection.

Processor 222 may include one or more general or specific purpose processors to perform computation and control functions of system 200. Processor 222 may include a single integrated circuit, such as a micro-processing device, or may include multiple integrated circuit devices and/or circuit boards working in cooperation to accomplish the functions of processor 222. In addition, processor 222 may execute computer programs, such as operating system 215, artificial intelligence module 216, and other applications 218, stored within memory 214.

System 200 may include memory 214 for storing information and instructions for execution by processor 222. Memory 214 may contain various components for retrieving, presenting, modifying, and storing data. For example, memory 214 may store software modules that provide functionality when executed by processor 222. The modules may include an operating system 215 that provides operating system functionality for system 200. The modules can include an operating system 215, artificial intelligence module 216 configured to perform machine predication and/or artificial intelligence functionality as described herein, as well as other applications modules 218. Artificial intelligence module 216 and/or other applications module 218 can include application programming interfaces, libraries, or other artificial intelligence or machine learning tools, such as Tensorflow, OpenAI Gym, NumPy, and other suitable libraries or tools. Operating system 215 provides operating system functionality for system 200. In some instances, artificial intelligence module 216 may be implemented as an in-memory configuration. In some implementations, when system 200 executes the functionality of artificial intelligence module 216, it implements a non-conventional specialized computer system that performs the functionality disclosed herein.

Non-transitory memory 214 may include a variety of computer-readable medium that may be accessed by processor 222. For example, memory 214 may include any combination of random access memory ("RAM"), dynamic RAM ("DRAM"), static RAM ("SRAM"), read only memory ("ROM"), flash memory, cache memory, and/or any other type of non-transitory computer-readable medium. Processor 222 is further coupled via bus 212 to a display 224, such as a Liquid Crystal Display ("LCD"). A keyboard 226 and a cursor control device 228, such as a computer mouse, are further coupled to communication device 212 to enable a user to interface with system 200.

In some embodiments, system 200 can be part of a larger system. Therefore, system 200 can include one or more additional functional modules 218 to include the additional functionality. A database 217 is coupled to bus 212 to provide centralized storage for modules 216 and 218 and to store, for example, data received planning module 216 or other data sources. Database 217 can store data in an integrated collection of logically-related records or files. Database 217 can be an operational database, an analytical database, a data warehouse, a distributed database, an end-user database, an external database, a navigational database, an in-memory database, a document-oriented database, a real-time database, a relational database, an object-oriented database, a non-relational database, a NoSQL database, Hadoop® distributed file system ("HDFS"), or any other database known in the art.

Although shown as a single system, the functionality of system 200 may be implemented as a distributed system. For example, memory 214 and processor 222 may be distributed across multiple different computers that collectively represent system 200. In one embodiment, system 200 may be part of a device (e.g., smartphone, tablet, computer, etc.). In an embodiment, system 200 may be separate from the device, and may remotely provide the disclosed functionality for the device. Further, one or more components of system 200 may not be included. For example, for functionality as a user or consumer device, system 200 may be a smartphone or other wireless device that includes a processor, memory, and a display, does not include one or more of the other components shown in FIG. 2, and includes additional components not shown in FIG. 2, such as an antenna, transceiver, or any other suitable wireless device component. Further, when implemented to execute functionality disclosed herein, system 200 is a special purpose computer, specially adapted to provide machine prediction and/or artificial intelligence functionality.

Referring back to FIG. 1, embodiments implement a variety forms of artificial intelligence that perform machine prediction, select parameters based on a criteria (e.g., arrive at a parameter optimization based on a reward function), as well as other functionality. For example, learning model 106 can be any model suitable to be trained by a batch of time series training data in order to perform machine prediction, such as a neural network. In some embodiments, learning model 106 can include a variational auto-encoder that implements an encoder, decoder, and neural network, where a loss or cost function is defined for training the neural network.

In some embodiments, the variational auto-encoder can include various layers where data can be encoded by the encoder to generate a vector, such as a latent vector, and subsequently decoded by the decoder. For example, training data can be passed through the encoder too generate such a vector. The neural network can be trained using the vectorized data, and the output of the neural network can be decoded by the decoder to return the data to a non-vectorized form. Similarly, when the trained neural network is used to perform machine prediction, the input data can be vectorized using the encoder and passed to the neural network, which can generate the prediction in vector form. The vectorized prediction can then be decoded by the decoder to output the prediction. Returning to FIG. 1, in some embodiments, training data 102, input 104, and the machine prediction output from learning model 106 can be time series data. For example, time series data predicted by learning model 106 can be fed to reinforcement learning model 108, for example to determine a set of parameters.

Reinforcement learning model 108 can be any model suitable to simulate conditions, such as game conditions, and interact with an artificial intelligence agent, such as artificial intelligence agent 112. Reinforcement learning model 108 and/or artificial intelligence agent 112 can be a Q-learning model that generates a Q-table representing policy for a variety of parameters, or any other suitable model. Reinforcement learning model 108 can vary one or more of these parameters to optimize an objective, such as a defined reward function. In some embodiments, reinforcement learning model 108 can iterate through steps of the simulation based on the predicted time series data. The result can generate parameters that meet a selection criteria, such as an optimized reward function.

In some embodiments, system 100 can be used to implement one or more agreements, which may include, inter alia, a tripartite agreement, direction letter agreement, intercreditor agreement and/or subordination agreement, and/or an agreement with a plurality of parties, such as a merchant, lender, and factor. For example, based on a variety of inputted terms, conditions, and/or assumptions relating to factoring and financing arrangements, such as those applicable to a medium or small business, system 100 can determine a variety of expected values of a demand for payment made by a lender to a factor.

For example, a tripartite agreement that outlines redirection obligations may be customized by any of the parties involved (e.g., lender/agent of lender, factor, merchant). In connection with some tripartite agreements, the lender can make a loan to the merchant pursuant to a loan agreement or loan and security agreement or similar agreement and a factor can purchase one or more invoices of the same merchant. In such cases, the lender and factor can enter into a tripartite agreement at or prior to such lending and/or factoring. The lender and factor can each be secured by all or a portion of the merchant's personal assets. Furthermore, there may be a payment or performance guarantee by one or more owners or affiliates of the merchant to the lender of the obligations of the merchant to the lender and there may be full or limited recourse to the merchant by the factor relating to the receivables being purchased by the factor. All or a portion of the proceeds of lender's financing may be used to refinance all or a portion of any facility provided by a current lender and/or factor. In some embodiments, the objective of the financing and factoring provided in connection with a tripartite agreement, related loan agreement, account receivable purchase agreement, and/or related documentation is to provide financing and factoring solutions to the merchant that are overall more favorable than those of other financing and factoring solutions of the merchant and/or to provide suitable financing and factoring solutions that are beneficial to the merchant, such as by lowering the overall costs of funding to the merchant and/or by improving the liquidity of the merchant by making funds available to the merchant earlier or in greater amounts than would otherwise be the case.

Under a sample agreement, upon receipt of a written demand for payment made by a lender to a factor, all or a portion of funds that would otherwise be payable by the factor to the merchant (e.g., the factored business) under or pursuant to the agreement (e.g., in part an accounts receivable purchase agreement ("ARPA") or similar agreement) is withheld by the factor, up to the full remaining unsatisfied amount of the demand and paid to the lender until the factor has paid the lender an aggregate amount in respect of such demand equal to the full amount set forth in such demand. In some embodiments, system 100 can analyze features related to the payment streams that would be payable in connection with an ARPA, the loan agreement, the tripartite agreement, any lockbox arrangements between the factor and one or more customers of the merchant, and/or related documentation executed in connection with the related factoring and lending arrangements.

In connection with examples of the tripartite agreement, the ARPA, and related documentation, there are a number of streams of payments between or among the merchant, one or more customers of the merchant, the factor, and the lender. Such payment streams may include, among other things, payments by one or more customers to a lockbox controlled, owned, and/or administered by or on behalf of the factor or directly to the merchant or any other party, payments by or on behalf of the factor to the lender pursuant to a demand issued in connection with a Tripartite Agreement, payments made by the merchant to the lender under the loan agreement, payments made by the factor to the merchant pursuant to or in connection with an ARPA, and payments made or deemed to be made by or on behalf of the merchant to the factor (including, without limitation, with respect to various fees). System 100 can analyze the timing, frequency, and amount of such payment streams and related payment streams that impact the amount of funds available, whether pursuant to any lockbox arrangement or otherwise, to lender pursuant to any demand that may be delivered by lender to factor during the term during which a Tripartite Agreement remains in place.

In some embodiments, system 100 implements one or more learning models that analyze multiple features including any and all lockbox arrangements, such as the timing and frequency of payments from such lockbox arrangements. System 100 can also consider the timing, amount, and frequency of purchases by the factor of any invoices contemplated to be purchased and which invoices flow through a lockbox account versus being paid directly to the merchant. System 100 can also analyze the size and timing of any payment of any reserve or residual that are payable by the terms of the ARPA by the factor to the merchant or to the lender pursuant to any demand, also considering the size of any service fees or other amounts the factor is permitted to charge or retain in connection with its factoring arrangements.

System 100 can also analyze the timing and frequency of advances by the factor to the merchant under or pursuant to an ARPA. System 100 can also analyze other financing that is being provided by the factor and whether or not related debt service and other financing payments flow through any lockbox arrangement. System 100 can also analyze lien priorities of the factor, the lender, and other parties, and the effects thereof on the probable recovery value of a demand.

In some embodiments, system 100 analyzes a probable recoverable value that a demand made on any given date or from time to time at any specified intervals/frequency will be paid in full or in part and what amount will likely be paid in connection with any such demand and how long it will likely take for any demand to be fully satisfied. As part of this analysis, system 100 can analyze whether the factoring includes spot or single invoice factoring or contract or invoice or high-volume factoring and the number of factored contracts or invoices, the duration of time for which amounts paid into any lockbox account remain in such lockbox account (and any cutoff time past which amounts so paid are retained in such lockbox until the following business day). In some embodiments, system 100 may also analyze the creditworthiness of customers, the factor and the borrower, and/or any guarantors of the borrower. The requisite data for system 100 can be stored in one or more data stores, or in any suitable data structure, as a series of transactions and analytic output records.

In some embodiments, system 100 can implement a set of rules which includes loan terms and invoice factorization terms (e.g., the ruleset); a store of time series data (e.g., the store); a software module for constructing a timeline of events (e.g., the timeline assembler); a software module for building model input features from the timeline (e.g., the featurizer and windowizer); a data science model for predicting the balance of the lockbox account (e.g., the balance prediction model); a system for training and tuning the model (e.g., the model fitter); and a software module for running simulations which test variances of the ruleset, for optimization purposes (e.g., the optimizer).

In some embodiments, the ruleset can include a set of parameters, such as the following: reserve percent=10%; factor fee=5%; monthly payment=$2000. In addition, some embodiments of the ruleset can include the following parameters to be optimized:

---

Demand Timing   The timing of when to demand payment from the lockbox.
The demand timing is composed of two parts:
1. Frequency of payment (i.e. daily, weekly, monthly)
2. Timing ordinal - represents the ordinal of the week or month (N/A for daily payments) that indicates

| | when we should demand payment (i.e. $2^{nd}$ day of the month; $1^{st}$ day of the week) |
|---|---|
| Loan Parameters | Includes the principal, interest rate, payment frequency (daily/weekly/monthly), and term of the loan; from this, the periodic payment amount can be computed |

The data store can be implemented as a database, for example containing the following fields: merchant_id; timestamp; event type (invoice generated, payment made, deposit received, invoice paid, invoice advanced, reserve paid, etc.); event amount; party name (name of party, other than merchant, involved in the event). In some embodiments, the data store contains time series data, where each record represents a historical transaction. For example, the data store can store historical data that will be transformed and used to train the learning model (e.g., balance predictor model) and/or is used as input for the learning model. The data can be defined by the following example of data definition language:

```
CREATE TYPE TX_TYPE AS ENUM (
    'advance',
    'invoice',
    'pay_fee',
    'pay_reserve',
    'payment',
    'repay_adv'
);
CREATE TYPE PARTY_TYPE AS ENUM (
    'factor',
    'lockbox',
    'merchant',
    'payor'
);
CREATE TABLE transactions (
    id SERIAL NOT NULL,
    tx_timestamp TIMESTAMP(0) NOT NULL,
    tx_type TX_TYPE NOT NULL,
    src_type PARTY_TYPE NOT NULL,
    src_id INT NOT NULL,
    dest_type PARTY_TYPE NOT NULL,
    dest_id INT NOT NULL,
    amount DECIMAL NOT NULL,
    ref_id INT
);
```

In some embodiments, the following custom data types, which can include transaction types, party types, and transactions, can be utilized by the schema:

TX_TYPE

| advance | Represents a cash advance from a factor to a merchant |
|---|---|
| invoice | Represents an invoice billed to a payor from a merchant |
| pay_fee | Represents the fee collected by the factor following the collection of receivables from the payor |
| pay_reserve | Represents a payment of the reserve from the factor to the merchant |
| payment | Payment of an invoice from a payor to a factor |
| repay_adv | Represents a reimbursement to the factor of the cash advance |

PARTY_TYPE

| factor | The factor that provides the factoring service to the merchant |
|---|---|
| lockbox | A logical account containing payables to the factor and receivables merchant, and from the payor |
| merchant | The party to whom the factor is providing factoring services |
| payor | The party responsible for paying a specific invoice from the merchant |

Transactions

| id | A unique id assigned to the transaction by the database |
|---|---|
| tx_timestamp | The date and time at which the transaction took place |
| tx_type | One of the possible values of TX_TYPE which indicates the nature of the transaction |
| src_type | One of the possible values of 'PARTY_TYPE' which indicates the classification of the source party of the transaction |
| src_id | A unique ID identifying the src of the transaction |
| dest_type | One of the possible values of 'PARTY_TYPE' which indicates the classification of the destination party of the transaction |
| dest_id | A unique ID identifying the destination party of the transaction |
| amount | The dollar value of the transaction |
| ref_id | An identifier that groups transactions related to a single invoice. Rows containing a 'tx_type' of 'pay_reserves' would not have a value for this column, since the factor would, most likely in practice, owe the merchant money pertaining to more than one invoice and would lump them together in a single payment. |

In some embodiments, the data store can be populated by a comma separated values ("CSV") file, for example where each row pertains to a transaction in a transaction stream.

In some embodiments, the timeline assembler can query the store for the set of events involving a specific merchant, and build a data structure in memory which contains the events, ordered by time. This structure may be a sparse array of lists of events. Each array element may be a list representing one day of time, and containing the events that occurred on that day.

In some embodiments, the featurizer may construct a list of scalar values for each day, such as lockbox balance; total payments by payors; total funds received by merchant; total of invoices sent by merchant; and the like. The list of these lists of scalars can be the set of features to be input to the model. The transaction data stored within the data store and/or the data featurized by the featurizer can represent training data 102 and/or input 104 of FIG. 1.

The balance prediction model can represent learning model 106 of FIG. 1. For example, the balance prediction model can be implemented as a variational auto-encoder. Suppose a number of days, or a window size, is defined at 90 (any other suitable number of days can be implemented). The variational auto-encoder can be trained to predict the balances for N number of days in the future—for example, suppose 90 days; given the input of scalars for days 1 through 90, the predicated output can be received for days 91 through 180; the scalars for days 2-91 can then be used to predict the output for days 92-181, and so on. In some embodiments, the featurizer and model fitter iterate the balance prediction model through a complete set of training scenarios which are supported by the amount of time series data contained in the data store. This produces a trained model which, given the metrics of the event information available from a past window of time, can estimate or predict the lockbox balance at a point in the future.

In some embodiments, the model fitter drives the featurizer to produce training and testing inputs and outputs for the balance predictor model, and tunes the balance predictor hyperparameters through the use of a hyperparameter generation method and the running of multiple model tests to find the best set of hyperparameters. Hyperparameter generation methods can include grid search, monte carlo, and genetic algorithm.

Once the model fitter has produced a trained and tuned balance predictor model, the optimizer can utilize the model to test various rulesets for optimization. In an embodiment, the optimizer can represent reinforcement learning model 108 and artificial intelligence agent 112 of FIG. 1, and the ruleset can represent configuration data 110 of FIG. 1. The goal, reward function, or selection criteria which is tested by the optimizer may be, but is not limited to, minimum risk of the lockbox falling below some percentage of a loan amount. For example, the optimizer can analyze historical data, use the featurizer to feed it to the learning model, and receive a future prediction (e.g., time series of the lockbox account balance). This can be repeated over a number of time periods, such as a number of days.

In some embodiments, historical balances can also be analyzed. The optimizer can test the rules for each day to see if the goal is met or to determine the resultant value of the reward function. The rules and/or parameters can be varied, and the process can be repeated. Subsequently, the set of rules with the best reward function score can be output from system 100, for example as parameter output 114. The optimizer can utilize grid search, monte carlo, a genetic algorithm, or other means of generating the rulesets to test. In some embodiments, that optimizer can be configured to perform random exploration of an action space (e.g., testing actions and forming policies based on the actions with the highest rewards), in combination with exploitation (e.g., picking the actions with the highest potential for reward).

Figure 3:
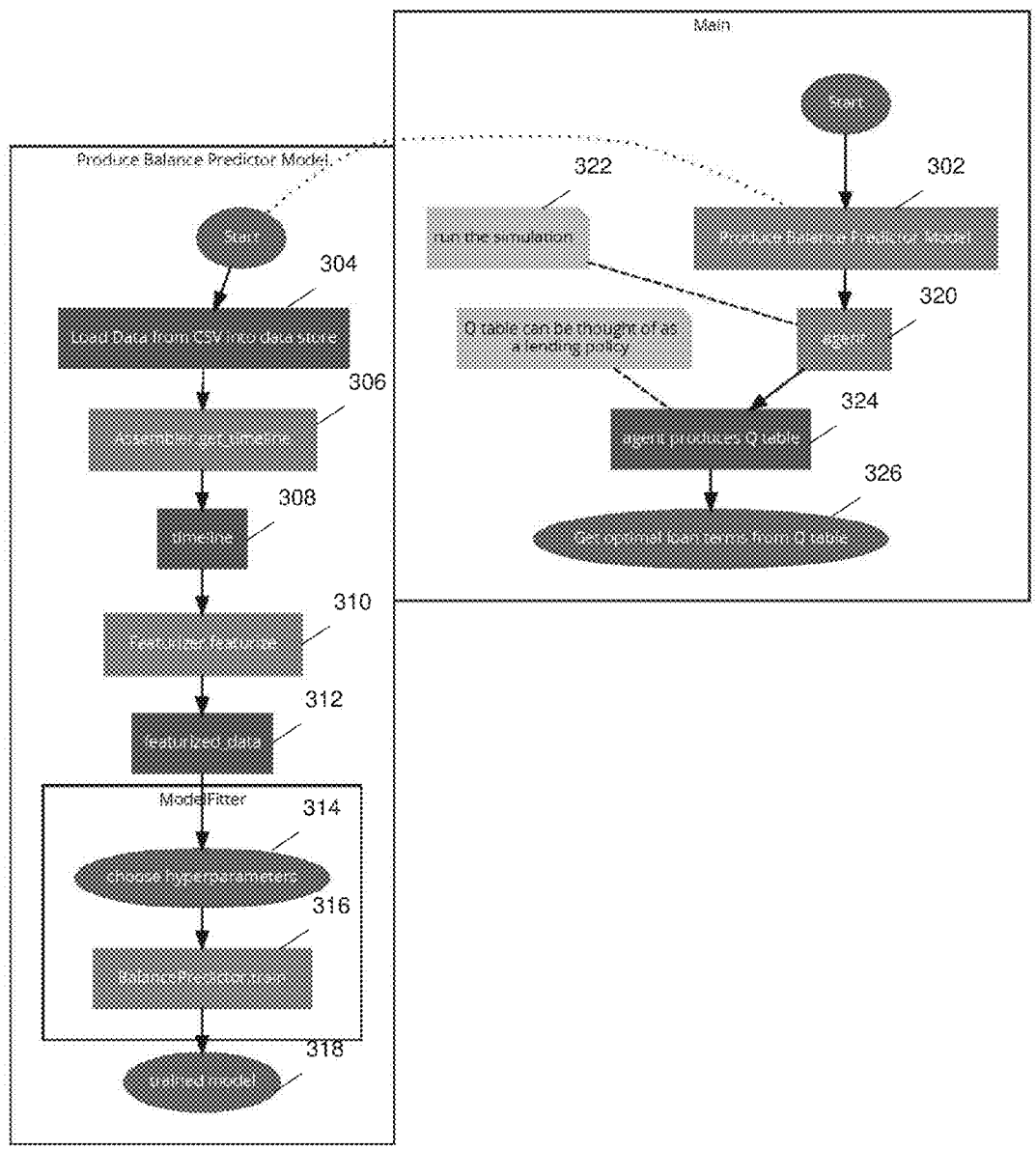
FIG. 3. illustrates a flow diagram for generating time series data predictions used to determine parameters by a reinforcement learning model according to an example embodiment.

FIG. 3. illustrates a flow diagram for generating time series data predictions used to determine parameters by a reinforcement learning model according to an example embodiment. In one embodiment, the functionality of FIGS. 3-19 and 25 is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. In embodiments, the functionality of FIGS. 3-19 and 25 can be performed by one or more elements of system 200 of FIG. 2.

The flow can begin at 302 where a balance predictor model can be produced. The balance predictor model can be an example of learning model 106 of FIG. 1. For example, at 304 data can be loaded from a CSV to a data store. At 306, an assembler can assemble a timeline of transactions for a merchant, such as timeline 308. At 310, a featurizer can featurize the assembled data to generate featurized data 312. At 314, hyperparameters can be chosen for the balance predictor model, and at 316, the balance predictor model can be trained to generate trained model 318. Training data 102 and input 104 of FIG. 1 can be example data stored in the data store that is featurized and fed into the balance predictor model. FIGS. 4-16 further illustrate the functionality for assembling, featurizing, and windowizing data, initializing the balance predictor model, and training the balance predictor model.

Figure 17:
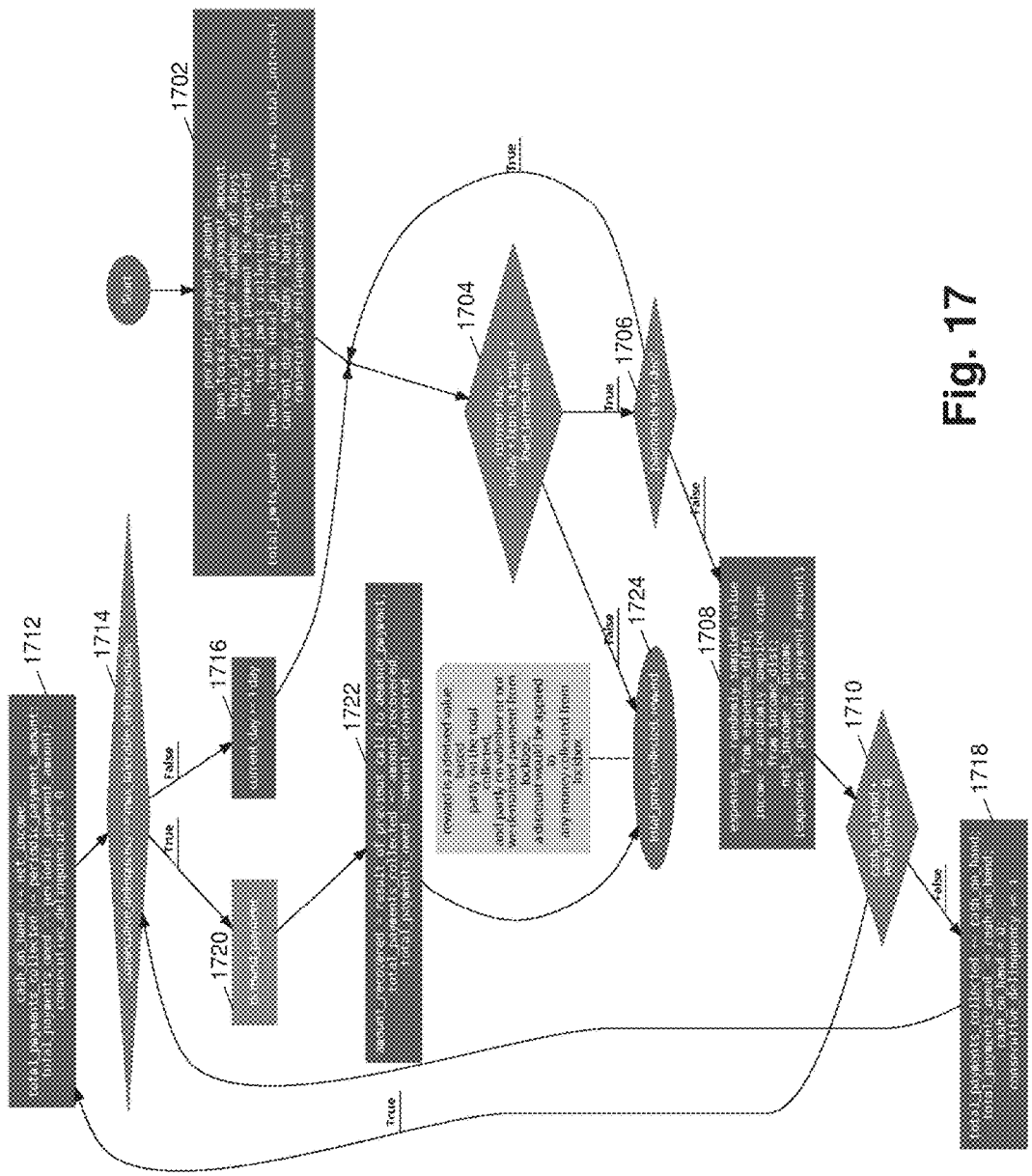
FIG. 17 illustrates a flow diagram for simulating a relationship amongst parties according to an example embodiment.
Figure 18:
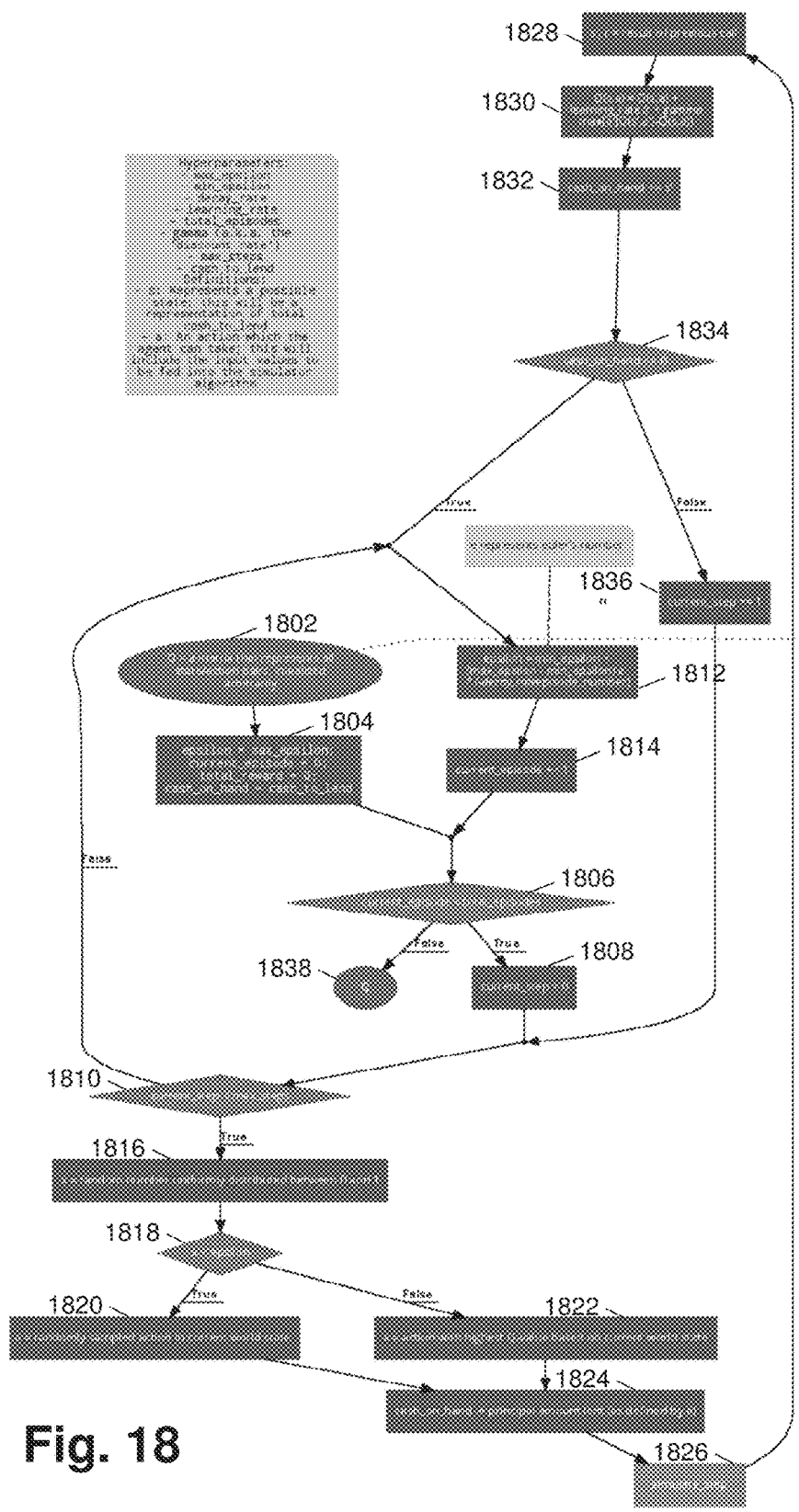
FIG. 18 illustrates a flow diagram for implementing an artificial intelligence agent that interacts with a simulation according to an example embodiment.
Figure 19:
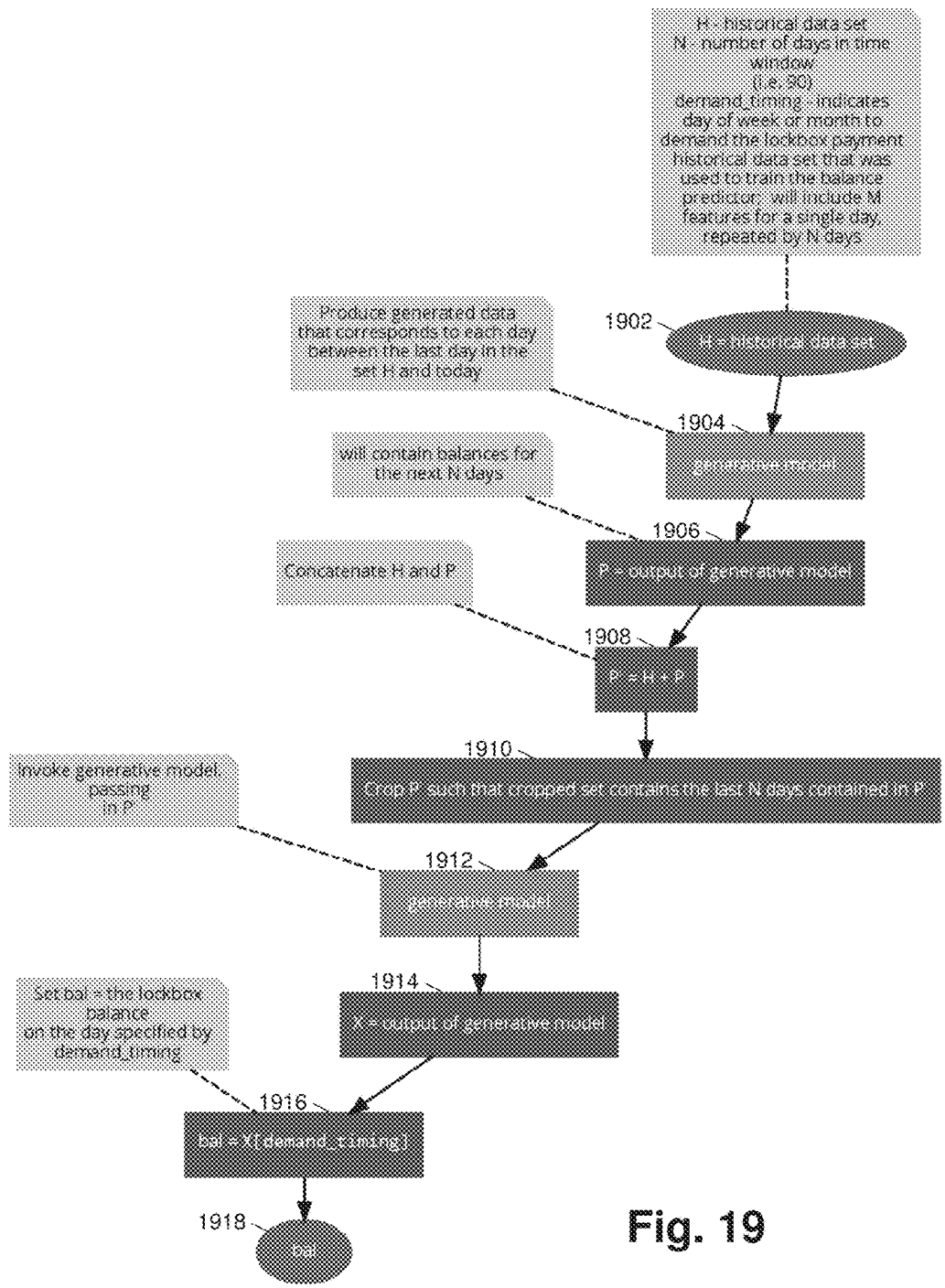
FIG. 19 illustrates a flow diagram for producing time series predictions using a trained learning model according to an example embodiment.

Once trained, the predictions generated by the balance predictor model can serve as input to a reinforcement learning model for optimizing one or more parameters. For example, at 320 an agent can iterate through a simulation run at 322. The reinforcement learning model/simulation/agent can be reinforcement learning model 108 and/or artificial intelligence agent 112 of FIG. 1. The agent can produce a policy, or Q-table, at 324. At 326 optimal parameters can be determined from the policy or Q-table, for example, based on the parameters that were determined to have a highest reward function value. FIGS. 17-19 further illustrate the functionality for configuring the simulation, iterating through the simulation with the agent, and determining a policy for one or more parameters.

Figure 4:
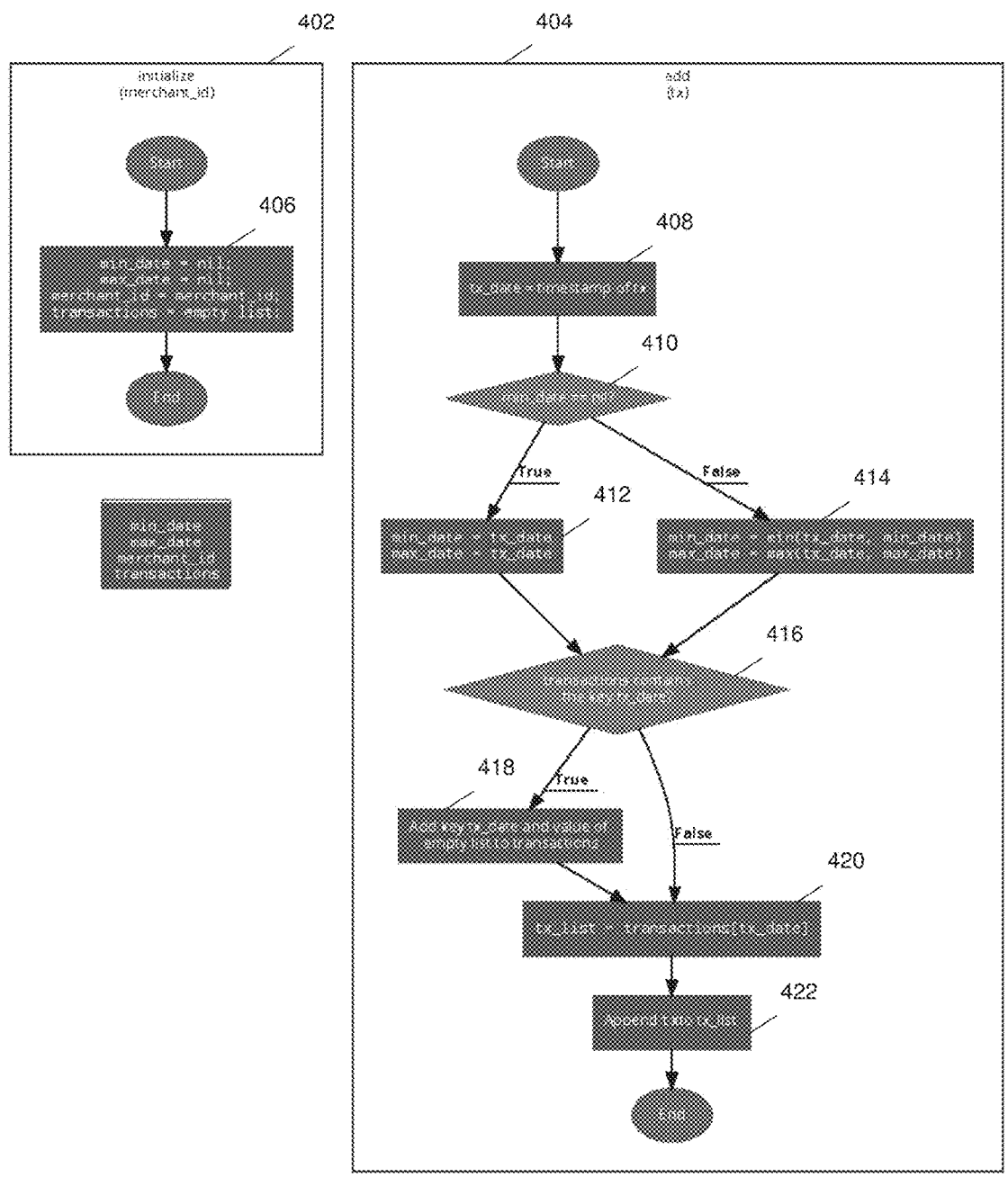
FIG. 4 illustrates a flow diagram for generating a list of transactions according to an example embodiment.
Figure 5:
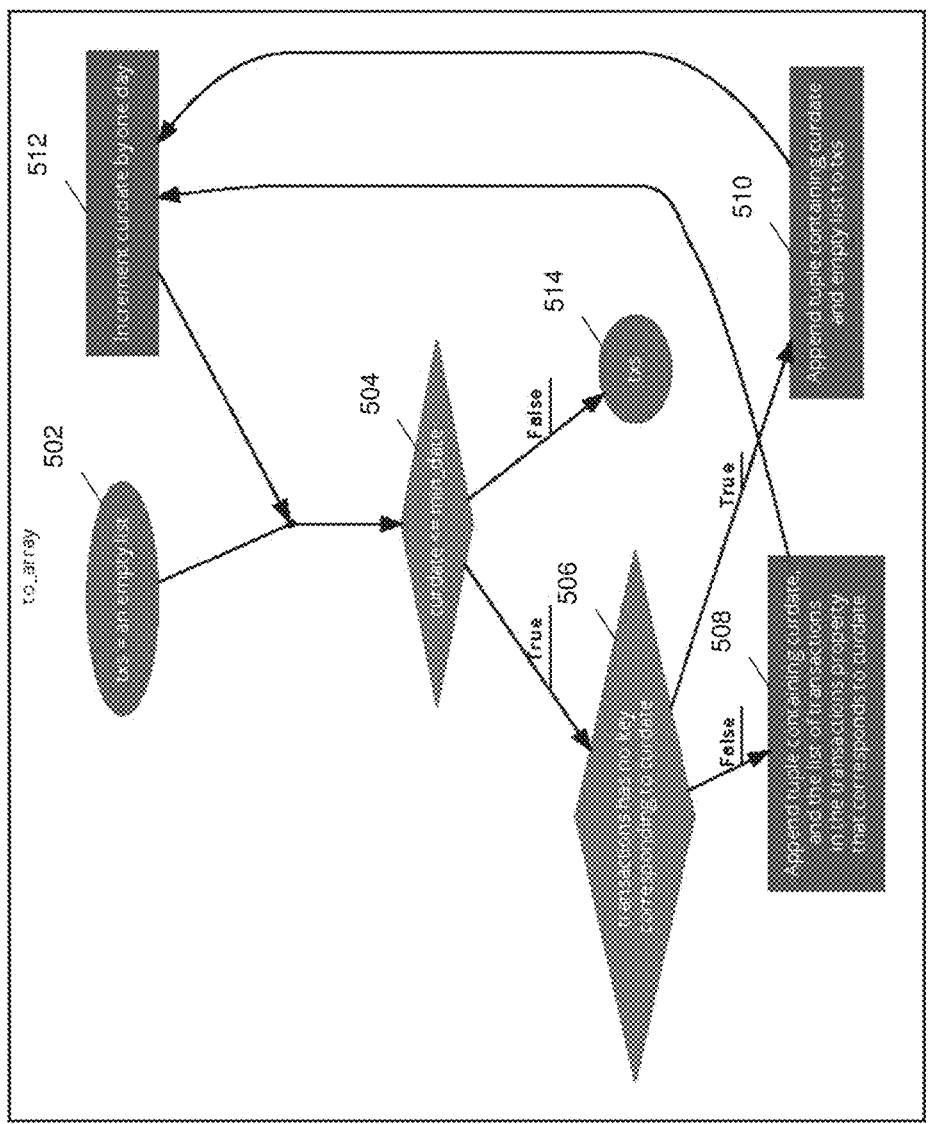
FIG. 5 illustrates a flow diagram for creating an array of transactions according to an example embodiment.
Figure 6:
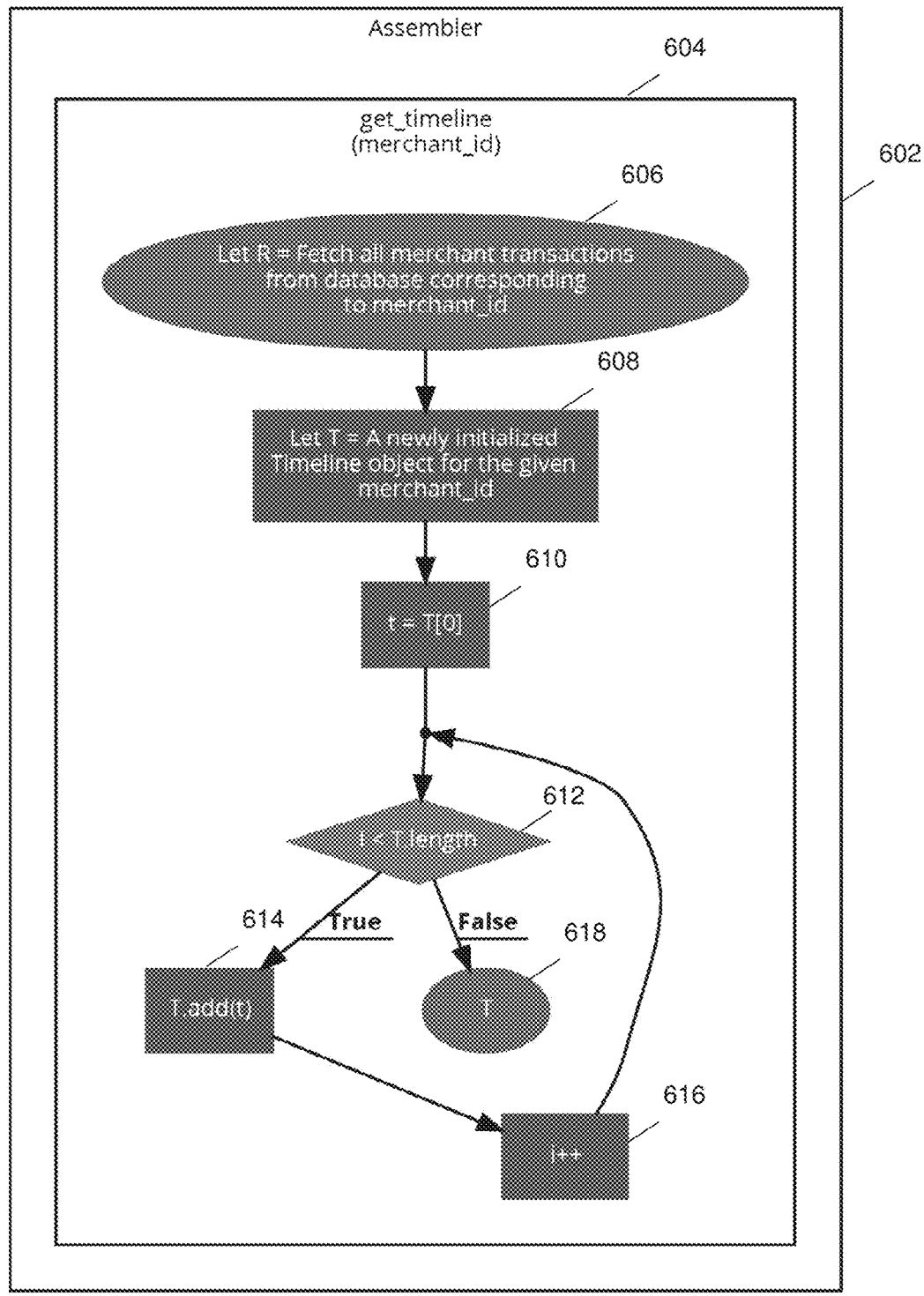
FIG. 6 illustrates a flow diagram for assembling a timeline of transactions according to an example embodiment.

FIG. 4-6 illustrate flow diagrams for assembling a timeline of transactions according to an example embodiment. With reference to FIG. 4, initialize function 402 can be used to initialize variables at 406, as demonstrated by the following:

Input:

| merchant_id | An identifier for the merchant which this Timeline corresponds to |
|---|---|

Set the min_date property to nil
Set the max_date property to nil
Set the merchant_id property to the value of the merchant_id input
Set the transactions property equal to an empty hash Add function 404 can be used by the assembler to append transactions to a transaction list, as demonstrated by the following:

Input:

| tx | A hash that contains key-value pairs, where keys represent the column name in the database and the value contains a value for the row represented by tx in the database |
|---|---|

{At 408} Let tx_date=tx['tx_timestamp'] (which represents the timestamp for the transaction)

{At 410} if the min_date is nil, and the max_date is nil:

{At 412} Set min_date=tx_date

{At 412} Set max_date=tx_date

{At 410} Else

{At 414} Set min_date=earlier of the two dates tx_date and min_date

{At 414} Set max_date=later of the two dates tx_date and max_date

{At 416} If the transactions property does not contain a list corresponding to tx_date, {At 418} then create one, and add it to the transactions hash, where the key is tx_date and the value is the empty list {At 420 and 422} Append tx to the list in transactions property that corresponds with tx_date With reference to FIG. 5, the to_array function can be used to generate and return an array of transactions grouped by date, as demonstrated by the following:

{At 502} Let txs=an empty list

{At 502} Let curdate='min_date' property

{At 504} while curdate<='max_date' property

{At 506} If the transactions property does not contain a record corresponding to curdate:

{At 510} Append a tuple containing curdate, and the empty list to 'txs'

{At 506} Else:
   {At 508} Append a tuple containing curdate, and the list of transactions in the 'transactions' property that corresponds to curdate
   {At 512} Set curdate=curdate+1 day
{At 514} Return txs With reference to FIG. 6, assembler 602 can implement the get_timline function 604 to assemble the timeline of transactions for the given merchant (e.g., identified by the merchant id). Initially, at 606, a query, such as a structured query language query, can be used to obtain data from a data store, such as a data store that stores transactions for one or more merchants according to the schema described above. An example SQL query to obtain this data for a given merchant is:

WITH invoices AS (
　SELECT DISTINCT ref_id
　FROM transactions
　WHERE
　　(src_type='merchant' and src_id=?) OR
　　(dest_type='merchant' and dest_id=?)
)
(
　SELECT t.*
　FROM transactions t, invoices i
　WHERE t.ref_id=i.ref_id
　UNION
　SELECT t.*
　FROM transactions t
　WHERE t.ref_id is NULL
　AND t.dest_type='merchant' AND t.dest_id=?
)
ORDER BY tx_timestamp ASC, ref_id ASC;
*Where ? is a placeholder for a particular merchant_id The get_timeline 604 function can then proceed as follows:
Input:

| | |
|---|---|
| merchant_id | The merchant ID for which we want to assemble a timeline |

{At 608} Let R=The results of executing the SQL referenced above, using the merchant_id provided as input
{At 610} Let T=A newly initialized Timeline object for the given merchant_id
{At 612 and 616} For each transaction (t) returned in R:
　{At 614} T.add(t)
{At 618} Return T Accordingly, flow diagrams of FIGS. 4-6 define initialize, add, to_array, and get_timeline functions that can be used to assemble a timeline for a given merchant identified by a merchant_id. In some embodiments, the assembled timeline can be associated with a min_date and a max_date defined by the transactions for the merchant. Once a timeline is assembled, the timeline can be passed to a featurizer to process the data for the variational auto-encoder.

Figure 7:
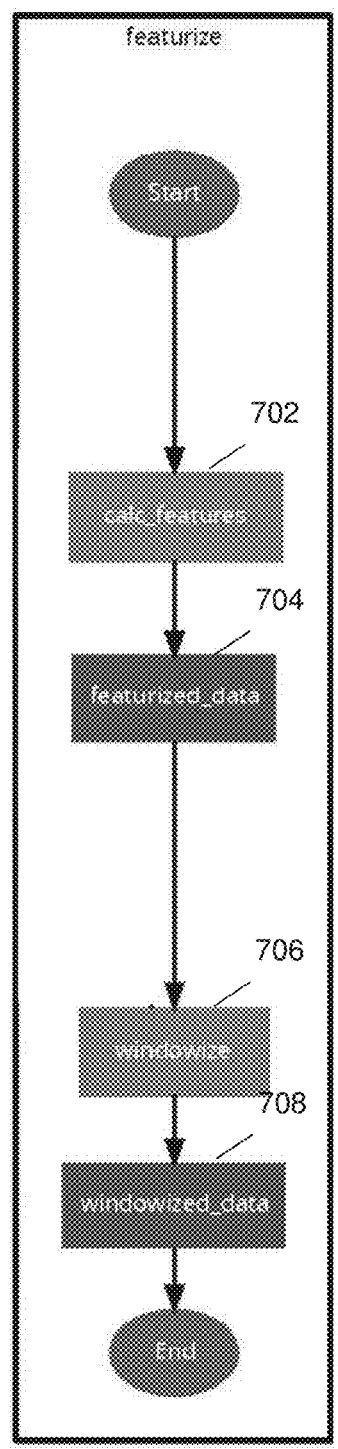
FIG. 7 illustrates a flow diagram for featurizing and windowizing data according to an example embodiment.

FIG. 7 illustrates a flow diagram for featurizing and windowizing data according to an example embodiment. The featurizer can calculate features at 702 to generate featurized data 704, and can then windowize the featurized data at 706 to generate windowized data 708. In some embodiments, the featurizer can create features from the raw transaction stream for a merchant. For example, the featurizer can utilize an assembled timeline for a merchant with a given merchant ID, and build a data set from which the balance predictor model can be trained and then used to predict future data values, such as a balance for a lockbox.

Embodiments of the featurizer, as depicted in this disclosure, outline specific features; however, these features could be subject to change and are mere examples. For instance, it may be beneficial to model the features in such a way that they represent accounts receivable and accounts payable from the perspective of the Lockbox. To that extent, the individual features which are being computed from the transaction stream may be subject to modification, addition of new features, or subtraction of features outlined in this document. Other embodiments can implement any suitable features.

Embodiments of the featurizer can include the following components:
　DayStats—Contains data points pertaining to a single date
　WindowStats—Contains a collection of DayStats instances, each representing consecutive days, for some period of N days
　Data featurizer—Accumulates various totals and data features based on the transaction stream from the timeline For example, DayStats can represent a collection of feature values on a specific day:
Properties

| | |
|---|---|
| lockbox_balance | The total cumulative balance of the lockbox |
| owed_to_factor | The total cumulative amount of money that is owed to the factor, including from advances given to the merchant, that have not yet been repaid. |
| advances_rcvd | The total amount of advances paid to the merchant on 'date' |
| pmts_rcvd | The total amount of payments received by the lockbox from payors on 'date' |
| advances_repaid | Advances repaid to the factor from the lockbox on 'date' |
| fees_paid | The total amount of fees paid from the lockbox to the factor on 'date' |
| reserve_paid_out | The total amount of reserve paid out from the lockbox to the merchant on 'date' |

A repr function can return a string representation of the DayStats object:
For each property, round to two digits and convert to a string
Join the strings from the previous step, each string separated by a comma
Return the newly constructed string In an embodiment, WindowStats can be a collection of DayStats objects, as well as a few other pieces of information, which allows a construction of a series of stats for N days, representing a window of time:
Properties

| | |
|---|---|
| merchant_id | The merchant ID for which this WindowStats is representative |
| stats_for_window | A series of DayStats objects that represent the stats for each of the N days in the window |
| next_day_stats | The DayStats object corresponding to day N + 1 |

A repr function can return a string representation of the WindowStats object:
Let t=a comma separated string composed of the following values:
　merchant_id
　min_date
　max_date next_day_stats.repr
stats_for_window[1].repr
stats_for_window[2].repr
. . .
stats_for_window[N].repr
Return t In an embodiment, the data featurizer constructs featurized data vectors that can be fed into the balance predictor model for training purposes. Properties for the data featurizer can include the assembled timeline and a window size, which represents N days, for example 7, 90, and any other suitable value.

Figure 8:
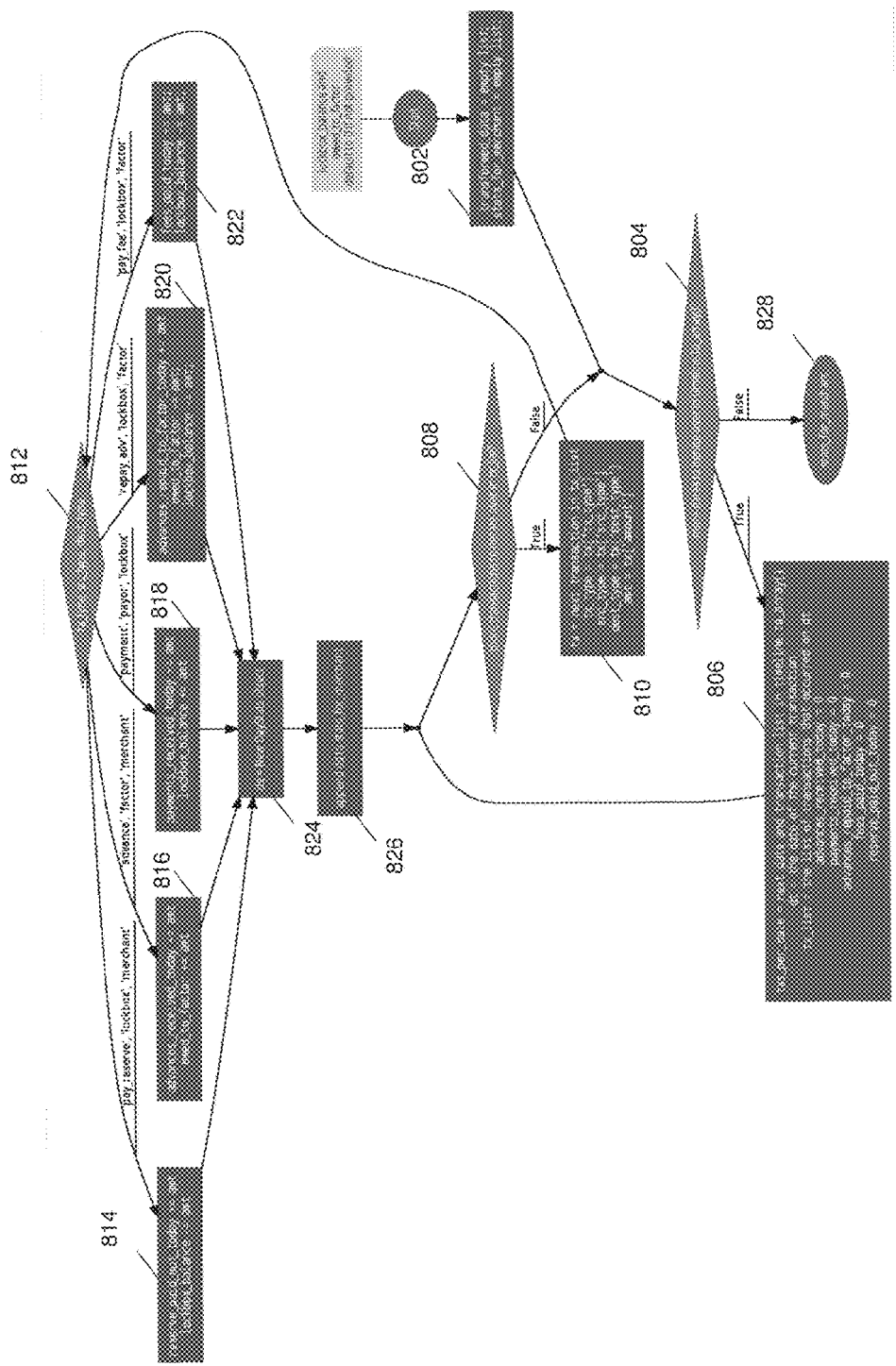
FIG. 8 illustrates a flow diagram for featurizing data according to an example embodiment.

For example, a featurize function can create windows of N days, where each day contains the value of all the features for that day. This function can be used to write the feature data out to a file, which can then be used to train the balance predictor model. FIG. 8 illustrates a flow diagram for featurizing data according to an example embodiment, as demonstrated by the following:

```
{At 802}   Let lock_bal = lockbox_balance
           Let owed_2_fac = owed_to_factor
           Let transformed_data = an empty list
           Let stats_for_merchant = an empty list
{At 804}   For txs_per_date in 'timeline.to_array':
   {At 806}   Let dt = txs_per_date[0]
   {At 806}   Let tx_list = txs_per_date[1]
   {At 806}   Let advances_receivedioday, payments_received_today,
              advances_repaid_to_factor_today, fees_paid_today, reserve_paid_out_today = 0,
              0, 0, 0, 0
       {At 808}   For tx in tx_list:
           {At 810}   Let tx_type = tx['tx_type']
           {At 810}   Let src_type = tx['src_type']
           {At 810}   Let dest_type = tx['dest_type']
           {At 810}   Let amt = tx['amount']
           {At 812}   If tx_type == 'advance' and src_type == 'factor' and
                      'dest_type' == 'merchant':
               {At 814}   Set advances_received_today += amt
               {At 814}   Set owed_2_fac += amt
           {At 812}   Else if tx_type == 'payment' and src_type == 'payor' and
                      dest_type == 'lockbox':
               {At 816}   Set payments_received_today += amt
               {At 816}   Set lock_bal += amt
           {At 812}   Else if tx_type == 'repay_adv' and src_type == 'lockbox'
                      and dest_type == 'factor':
               {At 818}   Set advances_repaid_to_factor_today +=
                          amt
               {At 818}   Set lock_bal -= amt
               {At 818}   Set owed_2_fac -= amt
           {At 812}   Else if tx_type == 'pay_fee' and src_type == 'lockbox' and
                      dest_type == 'factor':
               {At 820}   Set fees_paid_today += amt
               {At 820}   Set lock_bal -= amt
           {At 812}   Else if tx_type == 'pay_reserve' and src_type == 'lockbox'
                      and dest_type == 'merchant':
               {At 822}   Set reserve_paid_out_today += amt
               {At 822}   Set lock_bal -= amt
       {At 826}   Let DS = a new DayStets object constructed from all of
                  the above fields (as well as lock_bal and owed_2_fac)
{At 828}   Append DS to stats_for_merchant
```

Figure 9:
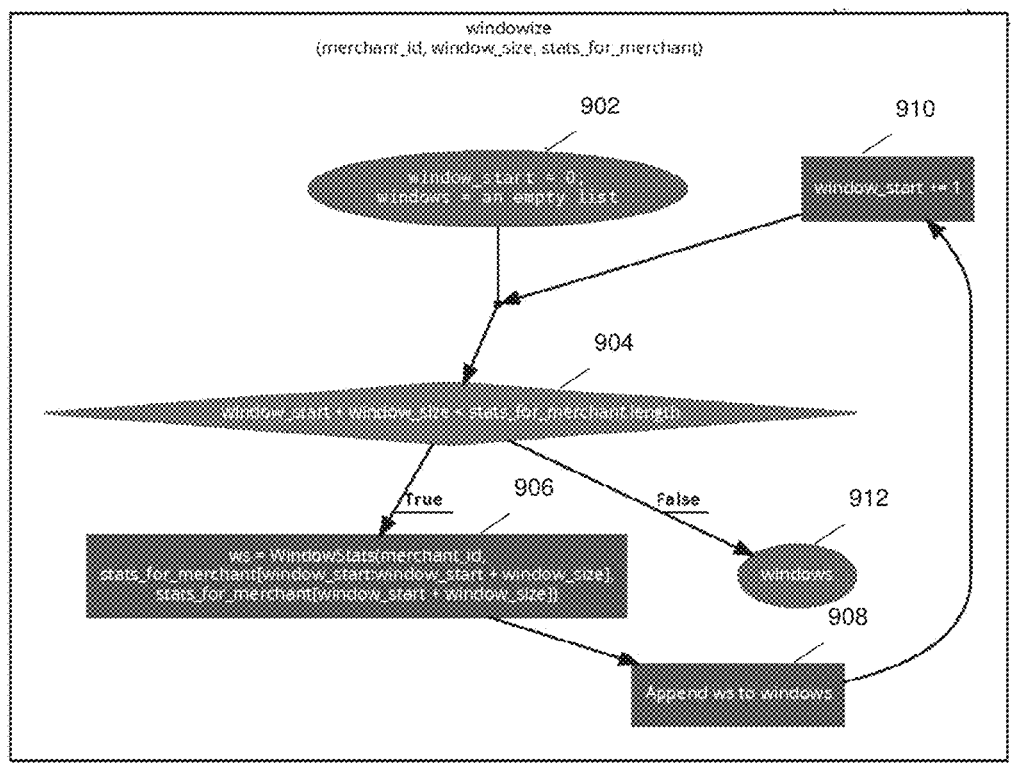
FIG. 9 illustrates a flow diagram for windowizing featurized data according to an example embodiment.

Once stats_for_merchant is generated, the featurize function can then windowize that data. FIG. 9 illustrates a flow diagram for windowizing featurized data according to an example embodiment, as demonstrated by the following:

{At 902} Let window_start=0

{At 902} Let windows=an empty list

{At 904} while window_start+window_size<len(stats_for_merchant):

{At 906} Let ws=WindowStats(merchant_id, stats_for_merchant[window_start:window_start+window_size], stats_for_merchant[window_start+window_size])

{At 908} Append ws to windows

{At 910} Set window_start=window_start+1

{At 912} Return windows

Figure 23:
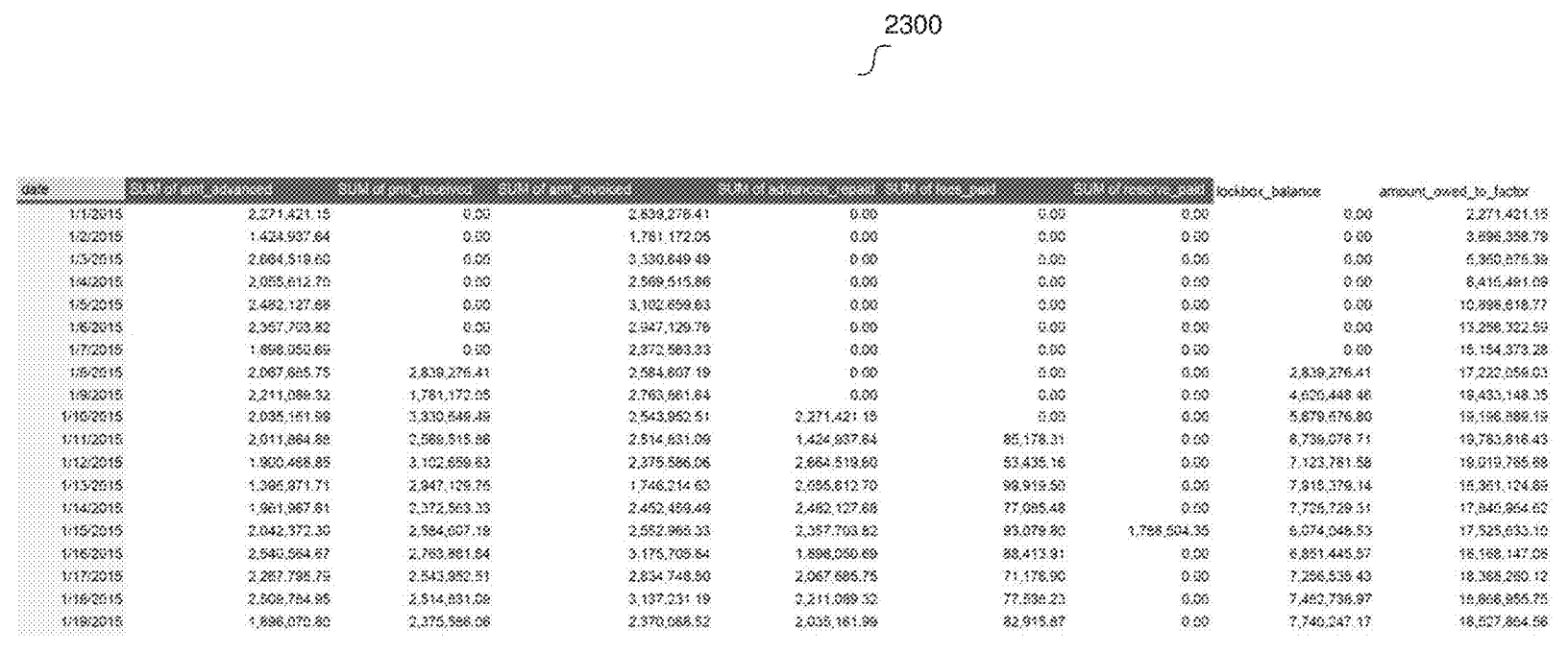
Figure 24:
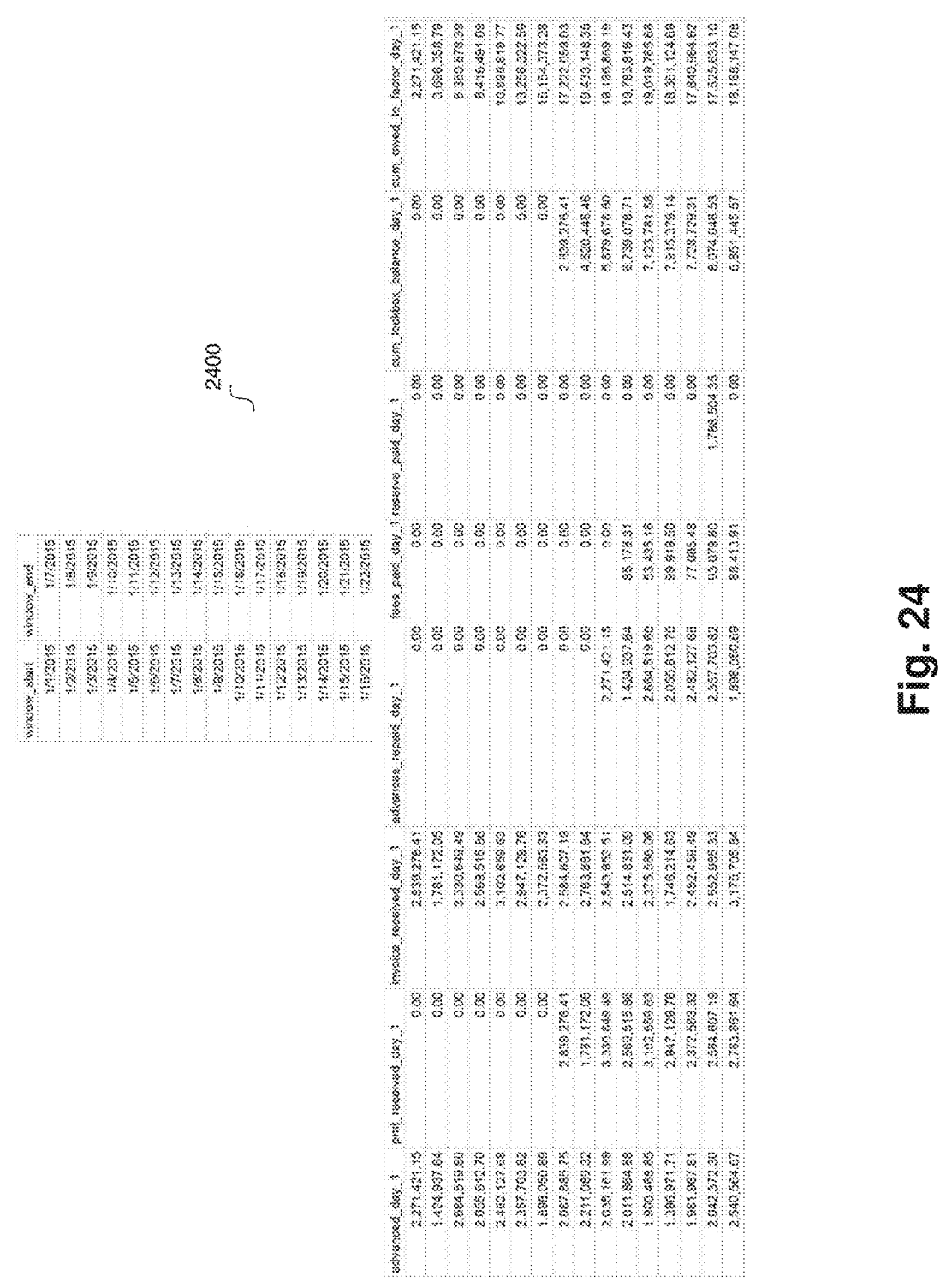

As illustrated above, in order to perform time series data prediction, the balance predictor model, which can be a variational auto-encoder, is implemented along with various forms of data, including time series data that is transformed in a variety of ways. FIGS. 20-24 illustrate data structures implemented with the variational auto-encoder model according to an example embodiment. Data structure 2000 of FIG. 20 represent raw data (e.g., 'Raw Input'), which is simply raw transactional data for a merchant that is fed into the system as input. For example, the raw data can include attributes such as a timestamp, transaction type (e.g., invoice, advance, repay_advance, pay_fee, and the like), source_type (e.g., merchant, factor, lockbox, payor, lender), destination type (e.g., merchant, factor, lockbox, payor, lender), amount (e.g., of funds for the transaction), and the like. Other suitable merchant attributes can similarly be implemented. Data structure 2100 of FIG. 21 represents data that the Timeline Assembler generates from the raw input—which is a list of transactions grouped by date. Data structure 2100 can be similar to data structure 2000, except sorted by timestamp, and then type. Once the timeline is assembled, it can be passed to the featurizer for further transformation, as shown in FIGS. 22-24.

Data structure 2200 of FIG. 22 classifies each transaction (from data structure 2100) as one of several different types, in some embodiments a pivot table can be created using the classifications. Data structure 2300 of FIG. 23 produces a SUM of each transaction type (based on data structure 2200), grouped by day. Data structure 2300 also adds cumulative values that indicate the lockbox balance and the amount owed to the factor at any given point. In an example, the sum values grouped by day can be a sum of amount advanced, sum of payment received, sum of amount invoiced, sum of advances repaid, sum of fees paid, and sum of reserve paid. In other words, additional features can be generated from the data and added to data structure 2300.

Data structure 2400 of FIG. 24 represents the output of the featurizer. The example illustrated in data structure 2400 includes windowized data that uses a window size of 7 days (some examples include a window size of 90 days, and any other suitable numbers of days, or fixed periods of time, can be implemented). The two data structures 2400 of FIG. 24 can represent a single combined data structure, where the window_start and window_end columns can be part of the remaining columns depicted. For each day in the 7 day window, data structure 2400 can include day values and cumulative values. For example, data structure 2400 shows payment received for day 1, invoice received for day 1, advances repaid for day 1, fees paid for day 1, reserve paid for day 1, cumulative lockbox balance for day 1, and cumulative owed to the factor for day 1. Data structure 2400 can similarly hold these values for days 2-7, or the remaining days of the per row windows.

Within the context of the balance predictor model (e.g., a variational auto-encoder or learning model 106 of FIG. 1), each row of data structure 2400 represents one set of inputs that would be fed into the balance predictor model for training. For example, in the first row of data structure 2400, the window size is 7 days, where each input SUM has a value for each of the seven days between 1/1/2015 and 1/7/2015. The second row of data structure 2400 has each input SUM for the seven days between 1/2/2015 and 1/8/2015. As each of these represent batches of training data, an example 'label' for each row of our training set is the corresponding row for the following 7 days. For example, the balance predictor model (e.g., a variational auto-encoder or learning model 106 of FIG. 1) can receive 7 days (or any other suitable windows size) worth of input, and generate 7 days (or any other window size) worth of prediction output.

The featurized historical training data can enable the balance predictor model (e.g., variational auto-encoder) to predict lockbox balances in the future, among other features. FIG. 10 illustrates a flow diagram for initializing a variational auto-encoder according to an example embodiment. For example, the initialized variational auto-encoder can be the balance predictor model used to predict the lockbox balance for future days. At 1002, the variational auto-encoder can be initialized, and at 1004, the variational auto-encoder can be trained.

In an embodiment, initialization function 1006 can take as parameters an input layer size D and a number of hidden layer size. These values will shape the structure of the variational auto-encoder, including the encoder and decoder. At 1008, A placeholder for input data can be created, which represents a batch of training data. At 1010 the encoder can be initialized, at 1012 the decoder can be initialized, and at 1014, the cost function can be defined. FIGS. 11-14 describe how the encoder and decoder are initialized, and how the cost function is defined.

Figure 11:
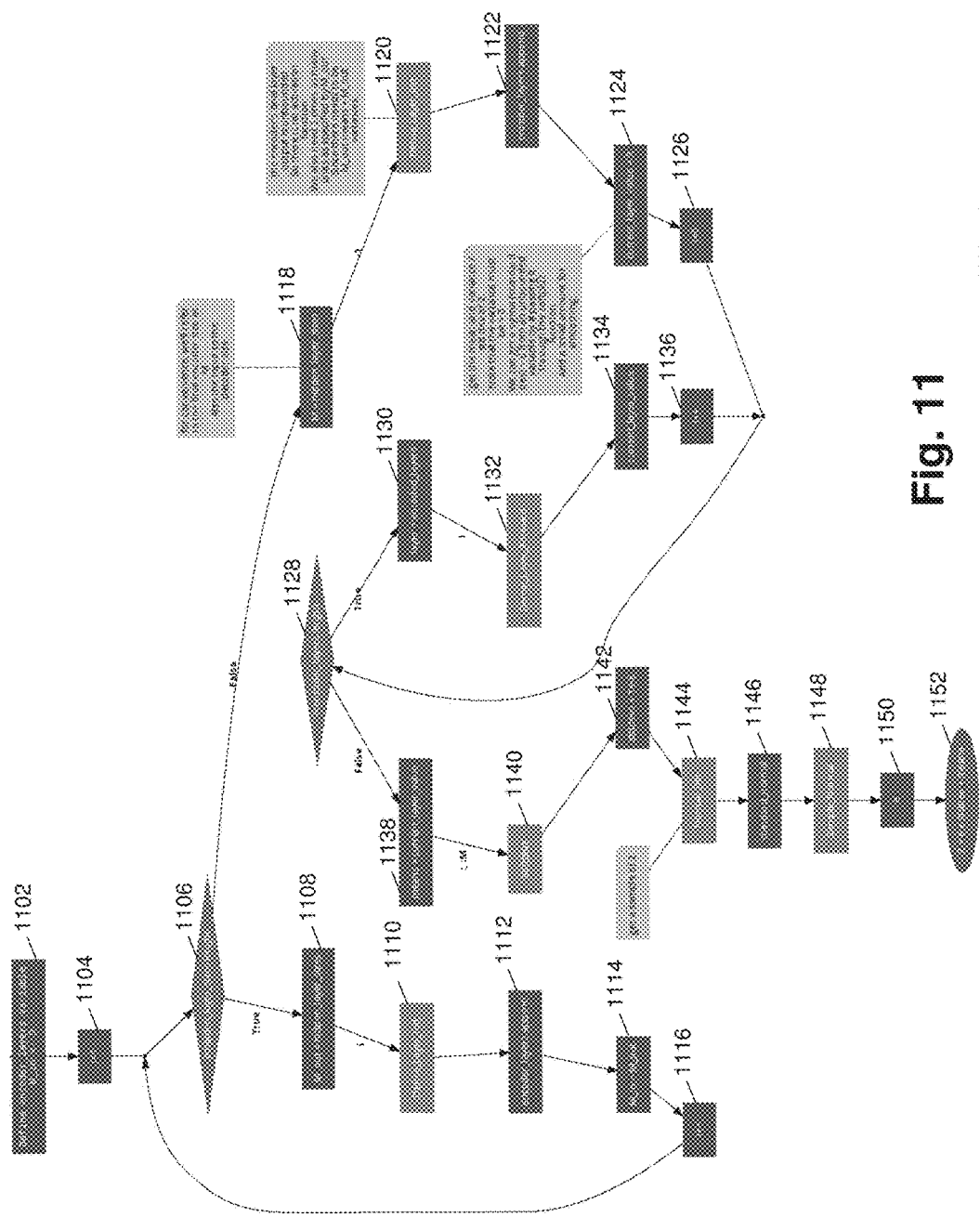
FIG. 11 illustrates a flow diagram for initializing an encoder for a variational auto-encoder according to an example embodiment.

FIG. 11 illustrates a flow diagram for initializing an encoder for a variational auto-encoder according to an example embodiment, as demonstrated by the following:
block Variational_Auto_Encoder { function Variational_Auto_Encoder_Init(D, hidden_layer_sizes) {
/* Input layer size (D), hidden layer sizes (hidden_layer_sizes) hidden_layer_sizes specifies the size of every layer in the encoder up to the final hidden layer Z the decoder will have the reverse shape */
begin;
{At 1008 of FIG. 10} Create a placeholder for input data (represents a batch of training data);
block encoder {
begin;
{At 1102} Define encoder_layers variable;
{At 1102} M_in←D;
{At 1104, 1106, 1116} for (i=1; i<hidden_layer_sizes.length; i++) {
  {At 1106} M_out=hidden_layer_sizes[i];
  {At 1110} call Dense_Layer_Init(M_in, M_out);
  {At 1112} encoder_layers.append;
  {At 1114} M_in =M_out;
  };
/* for convenience, we'll refer to the final encoder size as M Also the input to the decoder size */
{At 1118} M=hidden_layer_sizes[-1];
/* the encoder's final layer output is unbounded so there is no activation function. we also need 2 times as many units as specified by M_out since there needs to be M_out means+M_out variances */
{At 1120} call Dense_Layer_Init(M_in, 2M, f=lambda x: x);
{At 1122} encoder_layers.append;
/* get the mean and variance/std dev of Z. We can get a sigma (standard dev)>0 from an unbounded variable by passing it through the softplus function. Add a small amount for smoothing. */
{At 1124} current_layer_value=X;
{At 1126, 1128, 1136} for (i=0; i<encoder_layers.length; i++) {
  {At 1130} layer=encoded_layers[i];
  {At 1132} call Dense_Layer_Forward(currentlayer_value);
  {At 1134} current_layer_value;
  };
{At 1138} means=current_layer_value[:, :M];
{At 1140} call softplus(current_layer_value[:, M:]);
{At 1142} stddevs+1e-6;
// get a sample of Z
{At 1144} call Normal_Init(loc, scale);
{At 1146} standard_normal;
{At 1148} call Sample_Normal(means[0]);
{At 1150} e;
{At 1152} Z=e×stddev+means;
End;
};
  Embodiments of the variational auto-encoder also implement a number of helper functions, for example:
function Normal_Init(location, scale) {
  begin;
  Initialize normal distribution;
  end;
};
function Sample_Normal(shape) {
  begin;
  Sample from a normal distribution;
  end;
};
function Bernoulli_Init(values) {
  begin;

Initialize Bernoulli distribution;
end;
};
function Bernoulli_Sample(values) {
begin;
Sample from Bernoulli distribution;
end;
};
function softplus(value) {
begin;
softplus activation of value;
end;
}

Figure 12:
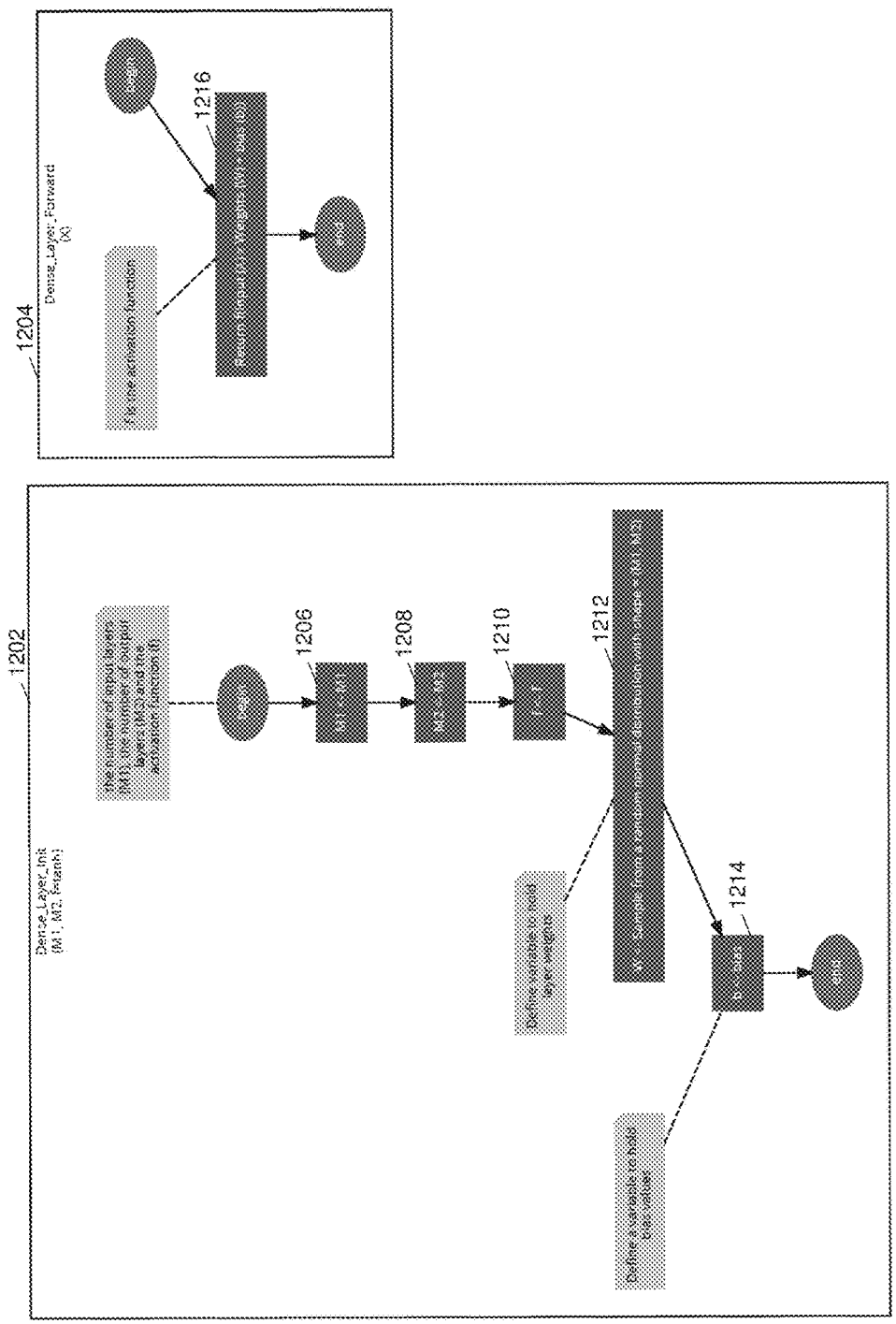
FIG. 12 illustrates a flow diagram for a feed forward neural network according to an example embodiment.
Figure 13:
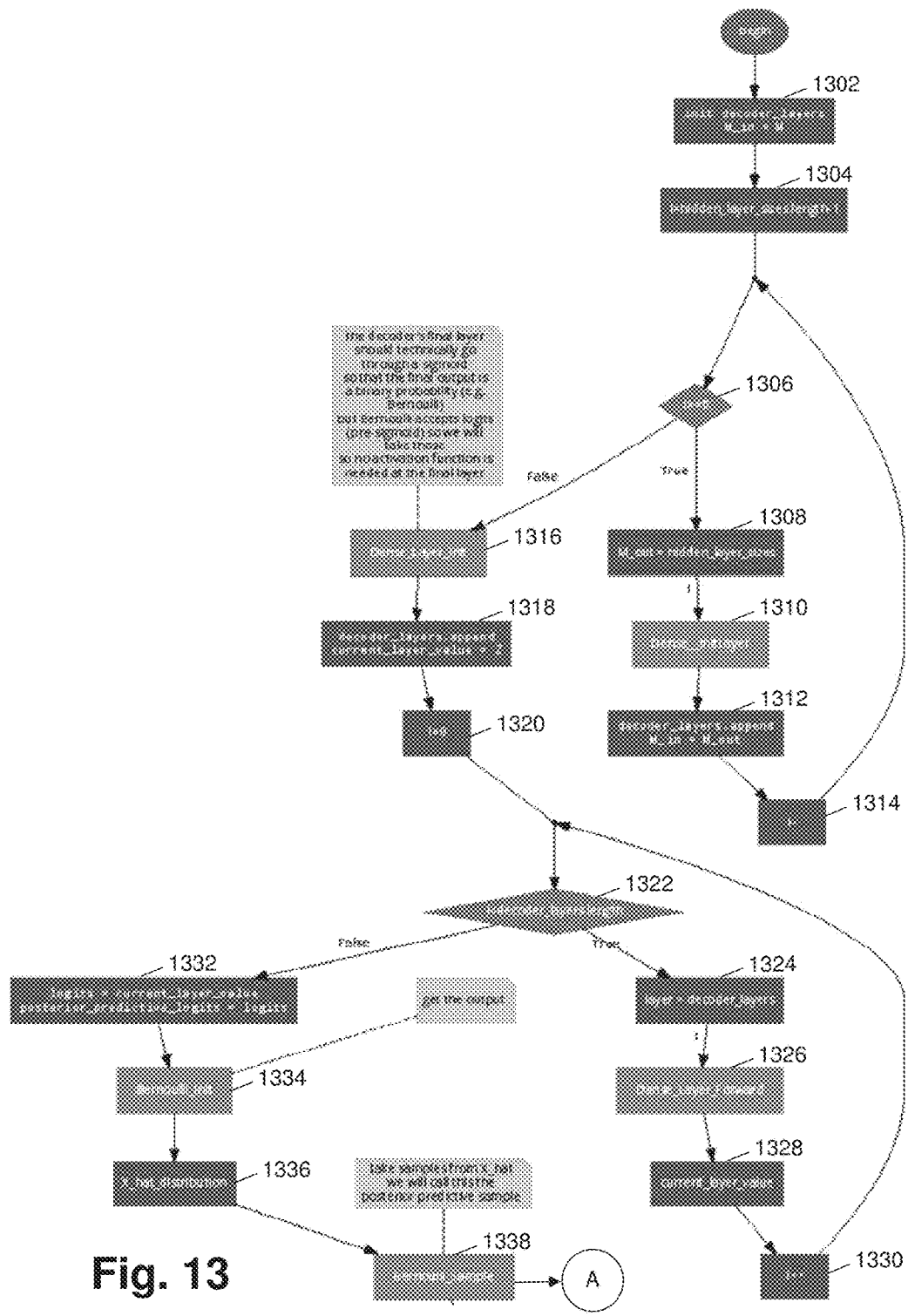
FIGS. 13-14 illustrate a flow diagram for initializing a decoder for a variational auto-encoder according to an example embodiment.
Figure 14:
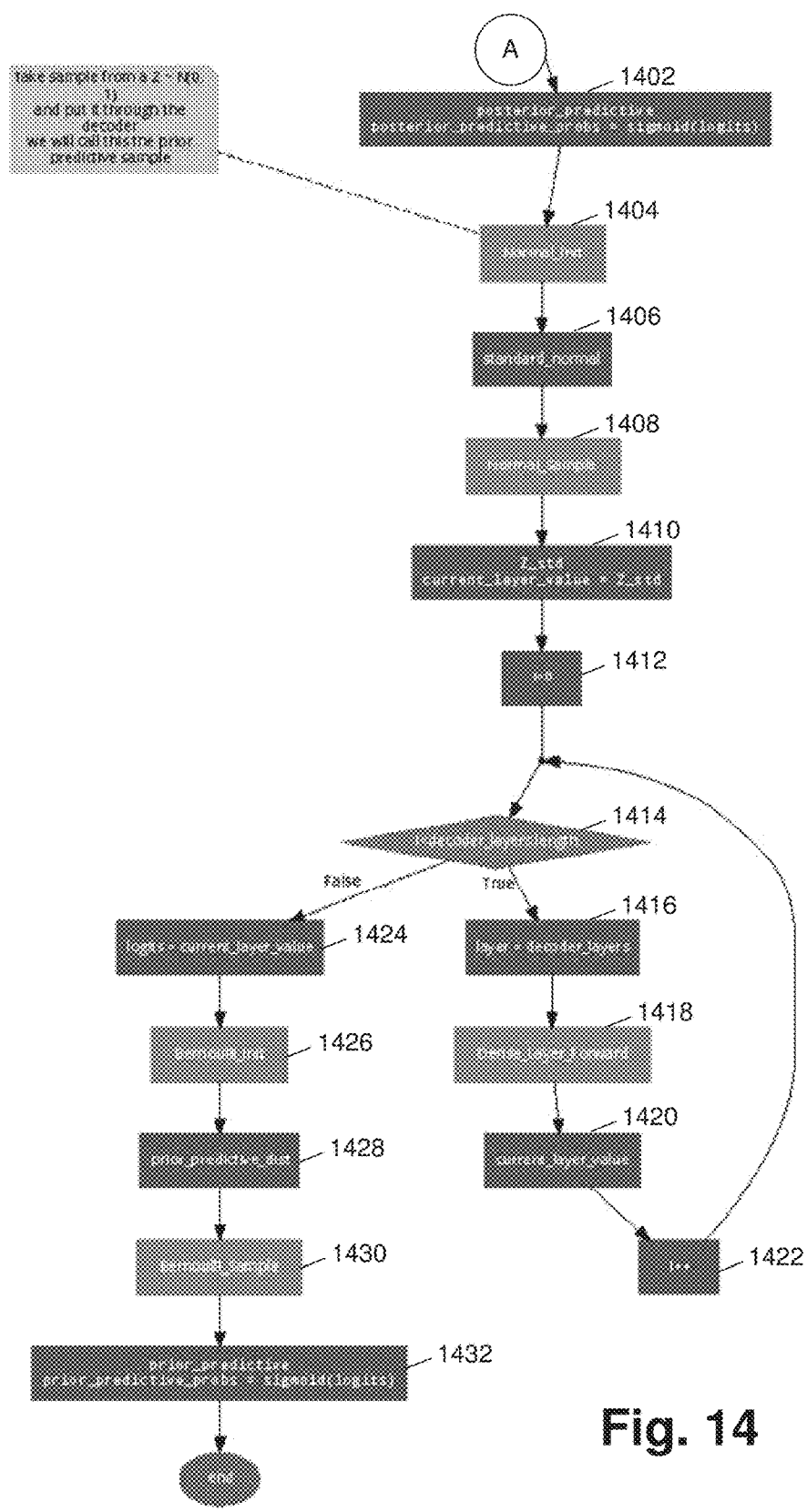
Figure 15:
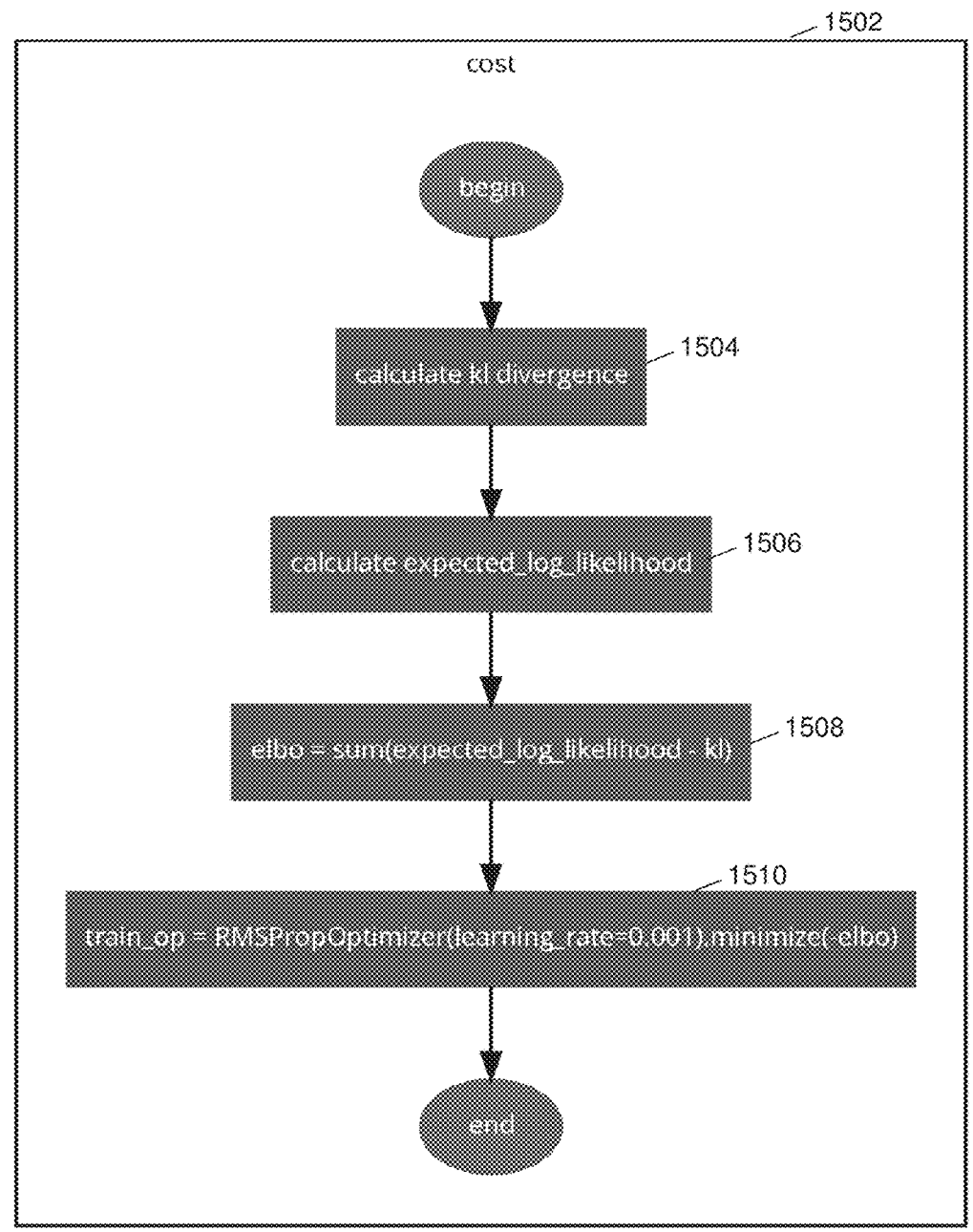
FIG. 15 illustrates a flow diagram for defining a cost function for a variational auto-encoder according to an example embodiment.
Figure 16:
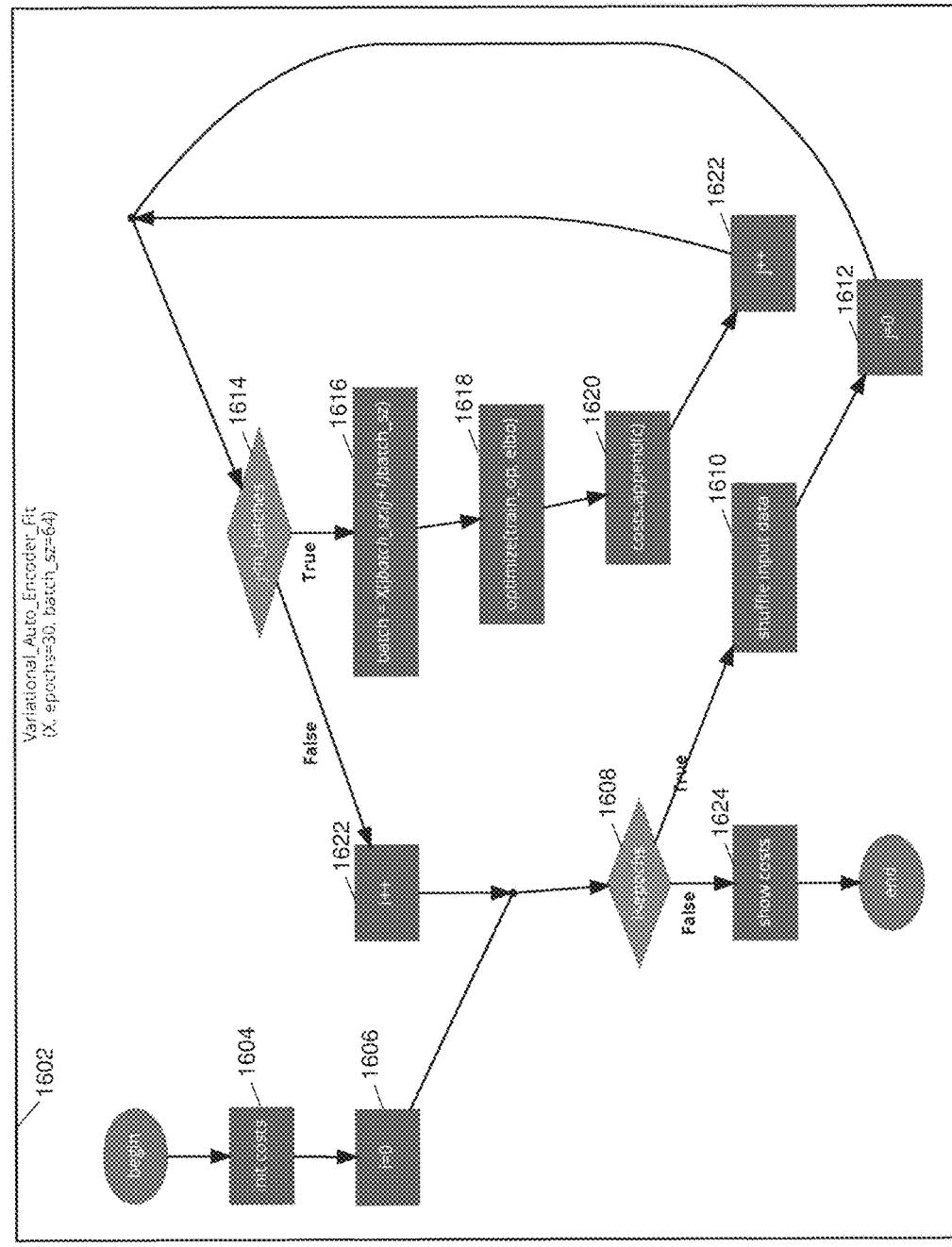
FIG. 16 illustrates a flow diagram for training a variational auto-encoder according to an example embodiment.

FIG. 12 illustrates a flow diagram for a feed forward neural network according to an example embodiment. For example, the dense layer init function 1202 and dense layer forward function 1204, as called by the encoder initialization function, are depicted in FIG. 12, as demonstrated by the following:
block Dense_Layer {
function Dense_Layer_Init(M1, M2, f=tan h) {
/* the number of input layers (M1), the number of output layers (M2) and the activation function (f) */
begin;
{At 1206} M1←M1;
{At 1208} M2←M2;
{At 1210} f←f;
/* Define variable to hold layer weights */
{At 1212} W←Sample from a random normal distribution with shape=(M1, M2);
* Define a variable to hold bias values */
{At 1214} b←bias;
end;
};
function Dense_Layer_Forward(X) {
begin;
/* f is the activation function */
{At 1216} Return f(Input (X)×Weights (W)+bias (b));
end;
};
};

FIGS. 13-14 illustrates a flow diagram for initializing a decoder for a variational auto-encoder according to an example embodiment, as demonstrated by the following.
block decoder {
begin;
{At 1302} init decoder_layers;
{At 1302} M_in =M;
{At 1304, 1306, 1314} for (i=hidden_layer_sizes.length−1; i>=0; i−−) {
  {At 1308} M_out=hidden_layer_sizes[i];
  {At 1310} call Dense_InitLayer(M_in, M_out);
  {At 1312} decoder_layers.append;
  {At 1312} M_in =M_out;
};
/* the decoder's final layer should technically go through a sigmoid so that the final output is a binary probability (e.g. Bernoulli) but Bernoulli accepts logits (pre-sigmoid) so we will take those so no activation function is needed at the final layer */
{At 1316} call Dense_Layer_Init(M_in, D, f=lambda x: x);
{At 1318} decoder_layers.append;
// get the logits
{At 1318} current_layer_value=Z;
{At 1320, 1322, 1330} for (i=0; i<decoder_layers.length; i++) {
  {At 1324} layer=decoder_layers[i];
  {At 1326} call Dense_Layer_Forward(current_layer_value);
  {At 1328} current_layer_value;
};
{At 1332} logits=current_layer_value;
// save for later
{At 1332} posterior_predictive_logits=logits;
// get the output
{At 1334} call Bernoulli_Init(logits=logits);
{At 1336} X_hat_distribution;
/* take samples from X_hat we will call this the posterior predictive sample */
{At 1338} call Bernoulli_Sample(X_hat_distribution);
{At 1402} posterior_predictive;
{At 1402} posterior_predictive_probs=sigmoid(logits);
/* take sample from a Z N(0, 1) and put it through the decoder we will call this the prior predictive sample*/
{At 1404} call Normal_Init(loc,scale);
{At 1406} standard_normal;
{At 1408} call Normal_Sample(standard_normal);
{At 1410} Z_std;
{At 1410} current_layer_value=Z_std;
{At 1412, 1414, 1422} for(i=0; i<decoder_layers.length; i++) {
  {At 1416} layer=decoder_layers;
  {At 1418} call Dense_Layer_Forward(current_layer_value);
  {At 1420} current_layer_value;
};
{At 1424} logits=current_layer_value;
{At 1426} call Bernoulli_Init(logits=logits);
{At 1428} prior_predictive_dist;
{At 1430} call Bernoulli_Sample(prior_predictive_dist);
{At 1432} prior_predictive;
{At 1434} prior_predictive_probs=sigmoid(logits);
end;
};

For training purposes, a cost function can be defined for the variational auto-encoder. FIG. 15 illustrates a flow diagram for defining a cost function for a variational auto-encoder according to an example embodiment. For example, cost function 1502 can be defined, as demonstrated by the following:
block cost {
begin;
{At 1504} calculate kl divergence;
{At 1506} calculate expected_log_likelihood;
{At 1508} elbo=sum(expected_log_likelihood−kl);
{At 1510} train_op=RMSPropOptimizer(learning_rate=0.001).minimize(-elbo);
};
};

FIG. 16 illustrates a flow diagram for training a variational auto-encoder according to an example embodiment. For example, given the previously described initialization functions for the variational auto-encoder and the defined cost function, training function 1602 can train the variational auto-encoder with batches of training data (e.g., featurized transactions data for a merchant), as demonstrated by the following:
function Variational_Auto_Encoder_Fit(X, epochs=30, batch_sz=64) {
begin;
{At 1604} init costs;
{At 1606, 1608, 1622} for(i=0; i<epochs; i++) {
  {At 1610} shuffle input data;
  {At 1612, 1614, 1622} for(j=0; j<n_batches; j++) {

{At 1616} batch=X[j*batch_sz:(j+1)*batch_sz];
{At 1618} optimize(train_op, elbo);
{At 1620} costs.append(c);
};
};
{At 1624} show costs;
end;
};
};

In an embodiment, a plurality of the defined functions can be called to initialize and train the variational auto-encoder, as defined by the following:
function main( ) {
begin;
read input data;
X=featurize input data;
call Variational_Auto_Encoder_Init(Input Layer Size, [Hidden Layer Sizes]);
call Variational_Auto_Encoder_Fit(X);
};

In an embodiment, a model fitter drives the featurizer to produce training and testing inputs and outputs for the balance predictor model. For example, the model fitter can tune the balance predictor model hyperparameters through the use of a hyperparameter generation method and the running of multiple model tests to find a variation of hyperparameters with accurate predictions. For example, over "n" iterations of model training, hyperparameters such as a number of hidden layers, a number of epocs, a learning rate, a number of input units, and the like can be varied. The predictions generated by the different variations can then be compared to the "labeled" data to determine accuracy. The variation of hyperparameters that achieves the highest accuracy can be implemented. In some embodiments, hyperparameter generation and tuning methods can include grid search, monte carlo, and/or genetic algorithm.

In an embodiment, an example row of input to the balance predictor model that can be used in some implementations includes:

[advanced_day_1, pmt_received_day_1, invoice_received_day_1, advances_repaid_day_1, fees_paid_day_1, reserve_paid_day_1, cum_lockbox_balance_day_1, cum_owed_to_factor_day_1, advanced_day_2, pmt_received_day_2, . . . Cum_owed_to_factor_day_7]

Or, this can be visualized as a matrix, as in the following example representing the 7 day window of time from 1/1/2015 to 1/7/2015:

| Day | Adv. | Paymt. Rcvd. | Invoice Rcvd. | Adv. Re-paid | Fees Paid | Re-serve Paid | Cum. Lock-box Bal-ance | Cum. Owed to Factor |
|---|---|---|---|---|---|---|---|---|
| 1 | 2,271,421.15 | 0.00 | 2,839,276.41 | 0.00 | 0.00 | 0.00 | 0.00 | 2,271,421.15 |
| 2 | 1,424,937.64 | 0.00 | 1,781,172.05 | 0.00 | 0.00 | 0.00 | 0.00 | 3,696,358.79 |
| 3 | 2,664,519.60 | 0.00 | 3,330,649.49 | 0.00 | 0.00 | 0.00 | 0.00 | 6,360,878.39 |
| 4 | 2,055,612.70 | 0.00 | 2,569,515.86 | 0.00 | 0.00 | 0.00 | 0.00 | 8,416,491.09 |
| 5 | 2,482,127.68 | 0.00 | 3,102,659.63 | 0.00 | 0.00 | 0.00 | 0.00 | 10,898,618.77 |
| 6 | 2,357,703.82 | 0.00 | 2,947,129.76 | 0.00 | 0.00 | 0.00 | 0.00 | 13,256,322.59 |
| 7 | 1,898,050.69 | 0.00 | 2,372,563.33 | 0.00 | 0.00 | 0.00 | 0.00 | 15,154,373.28 |

In an embodiment, upon feeding the data for the 1/1/2015-1/7/2015 7-day window into the balance predictor model for training, the label (or expected output) for that data would be the row corresponding to the 7-day window indicated by the 1/8/2015-1/14/2015 data. For the next training example, we would use the 1/2/2015-1/8/2015 as input, with the label/expected output being the 1/9/2015-1/15/2015 data, and so on. In other words, 7 days worth of data can be fed into the balance predictor model, and a prediction for the 7 days immediately following can be generated. However, this is only an example, and implementations may include many more data points, and different windows sizes (e.g., larger windows, such as 30 days, 60 days, 90 days, and the like).

In an embodiment, the optimizer component determines parameters for the parties to the agreement, such as loan parameters that meet a selection criteria (e.g., are optimized according to a reward function). The optimizer can implement a reinforcement learning model to determine the terms of a loan (e.g., interest rate, loan amount, loan term, the aggregate amount of the loan facility, the draw schedule, maximum draw amounts, and the like) and demand timing (e.g., a day of the week, or a day of the month) in which a demand is made against the lockbox should the merchant become delinquent or default on the loan. In some embodiments, the optimizer can optimize toward terms for a monthly payment amount that would be achievable by the merchant (e.g., a reward function can be defined that scores a monthly term higher than other terms).

In an embodiment, the optimizer can include a simulator, an agent, and a lockbox demander. For example, the simulator can simulate a single loan outcome. The simulator can be invoked repeatedly by the agent in order to learn an optimal policy. In an embodiment, the simulator, an agent, and a lockbox demander can represent reinforcement learning model 108 and artificial intelligence agent 112 of FIG. 1. FIG. 17 illustrates a flow diagram for simulating a relationship amongst parties according to an example embodiment, as demonstrated by the following:
Inputs

| | |
|---|---|
| max_consecutive_tolerable_delinquencies | Maximum number of permitted delinquent payments before a demand is made on the lockbox |
| merchant_cash_reserves | The amount of cash on hand for the merchant |
| income_distribution | A set of data representing the merchant's daily income |
| expense_distribution | A set of data representing the merchant's daily expenses |
| demand_timing_frequency | One of: monthly, weekly, or daily. Corresponds with the merchant's payment frequency |
| demand_timing_ordinal | Indicates the day of the month or week on which to demand payment (would not apply to daily payment frequency); a negative number could indicate that we are counting backwards from the end of the month or week |
| loan_principal | The principal amount of the loan lent to the merchant |
| loan_interest_rate | The interest rate on the loan |
| loan_payment_frequency | The frequency of payments made by the merchant |
| loan_term | Indicates the period of the loan, measured in months |

Outputs

| | |
|---|---|
| total_payment_collected | The total amount of cash collected from the merchant on the loan |
| reward | A reward value (which roughly represents total payment collected from the merchant, minus some discount for dollars that were collected via demand on the lockbox) |

{At 1702} Let periodic_payment_amount = computed periodic (monthly/weekly/daily) payment amount (based on the amount borrowed, term, interest rate, and frequency of payment)
{At 1702} Let burn_in_period = number of days before first payment is to be expected (This could either be done by taking a random sample between two values, i.e. 10 days and 17 days, or it could vary depending upon payment frequency)
{At 1702} Let total_payments_collected = 0.00
{At 1702} Let total_payments_owed = total principal + interest
{At 1702} Let cash_on_hand = the merchant's cash reserves
{At 1702} Let current_day = today + burn_in_period
{At 1702} Let consecutive_delinquency = 0
{At 1702} Let max_tolerable_delinquency = Max number of tolerable consecutive delinquencies
{At 1704} While current_day <= today + burn_in_period + loan_term:
    {At 1706} Check if payment is due:
    {At 1706 - 1704} If payment is not due, then continue to the next iteration of the loop
    {At 1706} Else, payment is due, attempt to collect:
        {At 1708} Let expenses = a randomly sampled value from expenses probability distribution
        {At 1708} Let income = a randomly sampled value from income probability distribution
        {At 1708} Let net_income = income – (expenses + periodic_payment_amount)
        {At 1710} If cash_on_hand + net_income >= 0:
            {At 1712} Set cash_on_hand = cash_on_hand + net_income
            {At 1712} Set total_payments_collected = total_payments_collected + periodic_payment_amount
            {At 1712} Set total_payments_owed = total_payments_owed – periodic_payment_amount
            {At 1712} Set consecutive_delinquency = 0
        {At 1710} Else (cash_on_hand + net_income < 0):
            {At 1718} Set total_payments_collected = total_payments_collected + cash_on_hand
            {At 1718} Set total_payments_owed = total_payments_owed – cash_on_hand
            {At 1718} Set cash_on_hand = 0
            {At 1718} Set consecutive_delinquency = consecutive_delinquency + 1
        {At 1714} If consecutive_delinquency >= max_tolerable_delinquency:
            {At 1720}//Demand payment
            {At 1722} Let amount_recovered = Result of executing 'Lockbox Demander' algorithm
            {At 1722} Set total_payments_collected = total_payments_collected + amount_recovered
            {At 1722} Set total_payments_owed = total_payments_owed – amount_recovered
            {At 1712 to 1724} Break loop;
    {At 1716} Set current_day = current_day + 1 day
{At 1724} Return total_payments_collected, and reward value (the reward would be derived from the total_payments_collected, but may have a penalty for dollars recovered from the lockbox, as this would indicate that we are placing financial strain on the merchant).

In an embodiment, the agent can be used in combination with the simulator to learn outcomes that maximize the reward function. For example, the agent can be implemented using a Q-learning model, but other suitable reinforcement learning models may also be implemented. FIG. 18 illustrates a flow diagram for implementing an artificial intelligence agent that interacts with a simulation according to an example embodiment, as demonstrated by the following:

Hyperparameters

| | |
|---|---|
| max_epsilon | Maximum value for epsilon (epsilon controls exploitation vs. exploration) |
| min_epsilon | Minimum value for epsilon |
| decay_rate | Decay rate which causes epsilon to be reduced every episode |
| learning_rate | The rate at which the model learns |
| total_episodes | Total number of episodes to execute in our RL model |
| gamma | The discount factor for future reward (as opposed to present reward) |
| max_steps | Maximum steps to execute in a given episode |
| cash_to_lend | Amount of cash available to lend out |

Definitions

| | |
|---|---|
| s | Represents a possible state; this will be a representation of total cash_to_lend |
| a | An action which the agent can take; this will include the input values to be fed into the simulator model |

Inputs

| | |
|---|---|
| cash_on_hand | The amount of cash available to lend out for the simulation |

Outputs

| policy | A table, such as a Q-table, which represents the optimal lending policy given a state (s) and a given possible action (a) |
|---|---|

{At 1802} Let Q(s, a) be a table that represents all state-action pairs, which is initialized arbitrarily
{At 1804} Let epsilon=max_epsilon
{At 1804} Let current_episode=0
{At 1804} Let total_reward=0
{At 1806} while current_episode<total_episodes:
 {At 1808} Let current_step=0
 {At 1810} while current_step<max_steps:
  {At 1816} Let x=a random number, uniformly distributed between 0 and 1
   {At 1818} If x<epsilon:
    {At 1820} Sample a random action (a) in the current world state (s)
   {At 1818} Else:
    {At 1822} Choose an action (a) with the highest Q-value based on the current world state (s)
    {At 1824} Set cashon_hand=cash_on_hand−[the principal amount lent, as defined by a]
  {At 1826} Simulate_step (Call to a separate function, for example, the flow depicted in FIG. 17, passing the state represented by a as the input)
  {At 1828} Let total_payment, reward=Result of invoking the simulator model, passing the state represented by a as the input (result of simulate step)
  /*Simulate_step can take the action (a) and observe the outcome state (s') and reward (r). s' can represent a new state following the result simulate_step. In this example, total_payment can represent s' and the reward can represent r*/
  {At 1830} Update Q(s,a)=Q(s,a)+learning_rate*(r+ gamma*max[a']Q(s', a')−Q(s,a))

{At 1832} Set cash_on_hand=cash_on_hand+total_payment
{At 1834} If cash_on_hand<=0.0:
 {At 1834 to 1812} break out of the inner loop
Else
 {At 1836} Set current_step=current_step+1

// e below refers to the well-known mathematical constant (euler's number)
{At 1812} Set epsilon=min_epsilon+(max_epsilon−min_epsilon)*e^−decay_rate*episode_number)
{At 1814} Set current_episode=current_episode+1
{At 1838} Return Q In some embodiments, the functionality of FIGS. 17 and 18 can be used in combination to simulate a number of loans (e.g., with varying parameters) over the course of each episode. For example, the agent can simulate many episodes during the course of learning. Each loan simulation can include a call to the simulator with a number of parameters (e.g., simulate_step call with state represented by action "a" at 1826 of FIG. 18) which can simulate an individual loan outcome based on the given parameters (e.g., using the functionality of FIG. 17).

In some embodiments, a Q-table can be generated by the simulation that can include reward values for the different sets of loan parameters. For example, a Q-table can be thought of as a matrix, where each row of the matrix represents a different unique state, and each column represents a given action that can be taken, given that state. The value contained in the matrix for a given action and given state is known as the Q-value, and represents the relative expected reward if a given action is taken during a given state.

In a sample implementation, the unique actions represented in embodiments of the Q-table would be different possible permutations of loan parameters as previously disclosed (e.g., demand timing frequency, demand timing ordinal, loan principal, loan interest rate, loan term, loan payment frequency, and the like). The below table represents an initialized Q-table, where initially the Q-table can be populated with zeros. As the simulations are performed, and the Q-values can be updated in the Q-table based on the outcomes of each simulation step. For example, a positive reward causes the Q-value to be adjusted upward, a negative reward causes the Q-value to be adjusted downward, and so on.

| Cash On Hand | Demand Timing Ordinal = 1, Demand Timing Frequency = Month Loan Interest Rate = 6.25% Loan Principal = 100,000.00 Loan Payment Frequency = Monthly Loan Term = 12 Months | Demand Timing Ordinal = 2, Demand Timing Frequency = Month Loan Interest Rate = 6.25% Loan Principal = 100,000.00 Loan Payment Frequency = Monthly Loan Term = 12 Months | | Demand Timing Ordinal = 2, Demand Timing Frequency = Day Loan Interest Rate = 7.125% Loan Principal = 125,000.00 Loan Payment Frequency = Monthly Loan Term = 10 Months | |
|---|---|---|---|---|---|
| 0 | 0 | 0 | . . . | 0 | . . . |
| 1000 | 0 | 0 | . . . | 0 | . . . |
| 2000 | 0 | 0 | . . . | 0 | . . . |
| 3000 | 0 | 0 | . . . | 0 | . . . |
| . . . | | | . . . | | |
| 10000 | 0 | 0 | . . . | 0 | . . . |
| . . . | | | . . . | | |
| 100000 | 0 | 0 | . . . | 0 | . . . |
| . . . | | | . . . | | |
| 10,000,000 | 0 | 0 | . . . | 0 | . . . |

In some examples, continuous variables (e.g., loan principal and interest rate) can be constrained to a minimum value, maximum value, with incremental intervals. For example, an interest rate can be between some minimum and maximum, and can be measured at $\frac{1}{8}$th intervals (e.g., an interest rate between 5%-10.125%, with the possible values containing every ⅛th of a percentage point between the two values, inclusive).

In some embodiments, the unique states represented in an example Q-table would be values that represent the cash on hand that the lender has with which to make loans. Since this is a continuous variable as well, the 'bucketizing' approach outlined above can be implemented. For example, consider that a minimum cash on hand is $0, and a max is $10,000,000; the possible values can have intervals of $1,000 (or any other suitable cash interval). In this example, for each state transition, the cash on hand can be rounded to the nearest $1,000 when updating the Q-table.

In some embodiments, continuous variables can be 'bucketized' so that the action space and state space can be constrained to reasonable sizes. These constraints allow for a policy to be learned using a reasonable amount of computing power. In some embodiments, the interval sizes for a continuous variable can be a hyper parameter that is adjusted as part of the simulation.

In an embodiment, a lockbox demander can use the trained balance predictor model to produce predictive data N days into the future. FIG. 19 illustrates a flow diagram for producing time series predictions using a trained learning model according to an example embodiment, as demonstrated by the following:

Inputs

| | |
|---|---|
| demand_timing_frequency | One of: monthly, weekly, or daily. Corresponds with the merchant's payment frequency |
| demand_timing_ordinal | Indicates the day of the month or week on which to demand payment (would not apply to daily payment frequency); a negative number could indicate that we are counting backwards from the end of the month or week |
| historical_data | The historical data set that was used to train the balance predictor net; this will include M features for a single day, repeated for N days (where N = window_size) |
| window_size | The size of the time window at which we are looking (90 days, for instance) |

{At 1902} Let H=historical_data
{At 1904} Load the balance predictor model into memory
{At 1904} Invoke the balance predictor model, passing in H, to produce generated data that corresponds to each day between the last day in the set H, and today
{At 1906} Let P=output of previous step
{At 1908} Let P'=combination of H+P for all days up until today, sorted by date ascending
{At 1910} Set P'=the cropped set such that the set contains the last N days contained in P'
{At 1912} Feed data from the set P' into balance predictor, and receive output for data starting with today and going N−1 days into the future;
{At 1914} Let X=the resulting prediction
{At 1916} Using the demand timing, select the value corresponding to the lockbox value on the day in X that corresponds with the demand timing
{At 1918} Return the value from previous step In an embodiment, historical data may not be up-to-date, and thus some machine prediction may be used to fill data between the day where the availability of data ends and the current day (e.g., today). For example, 1908-1910 of FIG. 9 use the balance predictor model to generate predictions for any gap between the historic data and the current day, and set the augmented data to P'. At 1912, P' is fed into the balance predictor model to generate balance predictions N−1 days into the future, as disclosed above. In embodiments where historic data is available up until the current day, P' may be omitted (e.g., 1908-1910 can be omitted, and P'=P).

Once trained, the balance predictor model can be used to generate time series data for the optimizer (e.g., simulator and AI agent). In an embodiment, the simulator can begin by picking loan terms and simulating outcomes (known as exploration) and can eventually learn policies through continued experimentation. In an embodiment, once gaining more experience, the simulator can iterate over less random exploration, and instead simulate lending based on the policy that it has learned (exploitation). The balance the agent/simulator strikes with regard to exploration and exploitation can be adjusted using different values of epsilon and/or decay rate. Below are sample parameters that the simulator and AI agent can vary and/or optimize:

| Field Name | Comments |
|---|---|
| Demand Timing Frequency | One of: Day, Week, or Month |
| Demand Timing Ordinal | An integer value relative to the Day, Week, or Month to demand payment |
| Loan Interest Rate | The annualized interest rate |
| Loan Principal | The principal amount of the loan |
| Loan Payment Frequency | Daily, Weekly, or Monthly |
| Loan Term | Measured in months |

In a first example, the demand frequency can be day, and the timing ordinal can be 1. This corresponds to demand payment the first day after the delinquent payment that triggered the demand for payment. Similarly, an ordinal of 2 would correspond to demand of the payment on the second day following the delinquent payment that triggered the demand for payment. In a second example, the demand frequency can be week, and the timing ordinal can be 4. This corresponds to a demand payment on the next occurrence of the fourth day of the week following the triggering delinquency (for example, 0 can represent Monday and 6 can represent Sunday). In other words, demand payment would be triggered on the first Friday following the delinquency.

In a third example, the demand frequency can be month, and the timing ordinal can be 15. This corresponds to demand payment on the 15th of the current month (if this date has not passed at the time of the delinquent payment) or the 15th of the next month (if the date has passed). In a fourth example, the demand frequency can be month, and the timing ordinal can be −2. This corresponds to demand payment on the 2nd-to-last day of the month following the triggering delinquent payment.

Loan term parameters can also be selected and/or varied during the simulation. Example loan terms can include the following terms:

Example 1

6.25% interest rate
$100,000.00 principal
Monthly payment frequency
Term of 12 Months Example 2

3.125% interest rate
$125,000.00 principal
Daily payment frequency
Term of 14 months In addition to the chosen demand timing and loan terms, the simulator can also receive as input the following parameters:

- Merchant's existing cash reserves/bank account balance. (e.g., determined from the merchant's bank statements).
- Income distribution (e.g., a vector of the merchant's income for the last N days, with each element of the vector representing the income on the nth day, which can be determined from the merchant's bank statements).
- Expense distribution, which is similar to the income distribution (e.g., determined from the merchant's bank statements).
- Max consecutive tolerable delinquencies (i.e. how many missed payments before we demand payment from the lockbox). This could be adjusted as a parameter to the simulation.

In an embodiment, these sample parameters can represent configuration data 110 of FIG. 1. In an example, a first iteration of the simulation can be initiated by choosing the following demand timing and loan terms:

6.25% interest rate
$100,000.00 principal
Monthly payments
Term of 12 months
Demand Timing Frequency of Monthly
Demand Timing Ordinal of 19

In this example, the day can be 2/15/2015, and the training data for the balance predictor model can be similar to the data represented in FIGS. 20-24 (e.g., ranging from 1/1/2015 to 2/9/2015). In some implementations, the simulator may simulate a scenario in which the merchant is delinquent in making a loan payment and that it is determined that a demand payment from the lockbox is to be made. The following functionality can be performed to issue the demand payment:

- The last window of the training data can be fed chronologically into the balance predictor model. For example, the chronologically last record could be the window from 2/3/2015-2/9/2015. Feeding this record into the balance predictor model can produce a prediction for the window of time ranging from 2/10/2015-2/16/2015, which provides data that includes the current date.
- Using the data from the 2/3/2015-2/9/2015 window, and the data from the 2/10/2015-2/16/2015 window (predicted according to the above), the data can be combined to construct a new window that represents the data up until the current date. This can result in a window from 2/9/2015-2/15/2016, which represents our 'current data' (even though some of it is extrapolated from past data). This data can be fed into the balance predictor model to generate a prediction for the window of 2/16/2015-2/22/2015.
- In this iteration of the simulation, the demand timing is the 19th of the Month. Since this data is encompassed by our current window, no further predictions are performed by the balance predictor model. The predicted lockbox balance for the 19th can be determined from the 2/16/2015-2/22/2015 output data. In other examples, additional iterations can be performed to continue generating windows of prediction until a balance for the demand date has been predicted. Using the predicted lockbox balance, we determine whether or not the outstanding amount to be collected (principal+interest) is greater or less than the predicted lockbox balance. If it is less than or equal to the predicted lockbox balance, the loan can be considered to be 'recovered'. If the outstanding amount to be collected is greater than the predicted lockbox balance, then we consider the loan to be not recovered, or partially recovered.
- Based on the outcome of the previous step, the reward is then computed and the simulation continues by varying parameters and iterating over a variety of conditions.

As described above, loan parameters, such as demand timing and loan terms, can be randomly selected by the agent during exploration, or selected by the agent according to the current state during exploitation (e.g., based on selecting the action with the highest Q-value in the current state). In some embodiments, the further the simulation advances, exploitation is performed more often since policy has previously been learned through exploration.

While embodiments describe implementations that predict an account balance and optimize parameters for an agreement among parties, the disclosed prediction model and reinforcement learning model can be used to generate other data predictions and optimize other parameters. For example, the disclosed stacked learning models can be implemented to optimize a configuration for computing resources, such as a software as a service and/or a cloud service offering. Such an implementation can include generating predictions for computing resource usage in the future, and optimizing one or more parameters for the computing resources (e.g., cloud shape, hardware availability, service tier, software availability, throttling, and the like). This implementation can include training data that represents historic computing resource usage. Other examples that generate other data predictions and optimize other parameters can similarly be implemented by configuring the stacked learning models for the given use case.

Embodiments of the time series prediction and reinforcement learning models realize a number of improvements over conventional implementations. For example, a standard prediction model (e.g., a neural network) is not able to optimize policy as well as embodiments of the disclosed reinforcement learning model. In addition, a standard reinforcement learning model cannot optimize a policy oriented in the future to provide the types of future insights described herein without input from an accurate time series prediction model that has learned trends in historical data (e.g., the trained prediction model described herein, such as a trained neural network and/or variational auto-encoder). In other words, embodiments of the stacked time series prediction model and reinforcement learning model disclosed herein result in predicted output that provides unique value with regard to accuracy, time horizon, and optimization.

In embodiments that include a variational auto-encoder for time series prediction, an additional benefit of improved accuracy for the predicted time series data is realized. For example, the variational auto-encoder uses Bayesian methods to learn the prior probability distribution of the time series data, and then samples the posterior data distribution to project the data out into the future. Embodiments of the variational autoencoder provide two capabilities—generation of data for 'gaps' that may exist in available/observed data (e.g., the period of time in between when the historical data ends and today, which is used to generate predictions into the future); and the reasonable projection of predictions in the future based upon the trends that it has learned.

This functionality would be more difficult to achieve using conventional approaches, such as a standard feed-forward neural network. Because of the ability to project data with certainty based on past transactions, embodiments are better able to identify patterns and trends from the data. Such improved identification provides increased time series data prediction accuracy, which in turn generates a more accurate result once the reinforcement learning model has learned an optimized policy.

Figure 25:
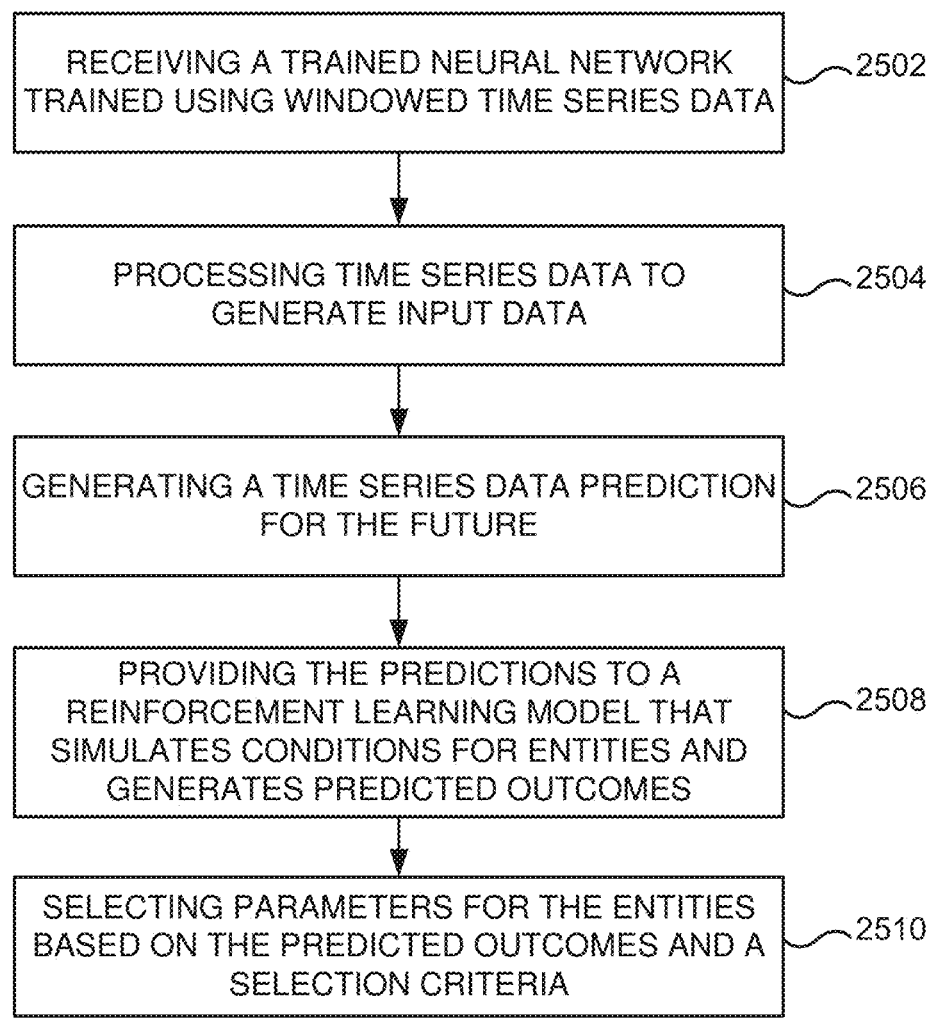
FIG. 25 illustrates a flow diagram for generating time series data predictions used to determine parameters by a reinforcement learning model according to an example embodiment.

FIG. 25 illustrates a flow diagram for generating time series data predictions used to determine parameters by a reinforcement learning model according to an example embodiment. At 2502, a trained neural network that is configured to generate a plurality of predictions for a plurality of periods of time in the future based on input data can be received, where the neural network is trained using training data that includes time series data segmented into a plurality of windows. For example, the trained neural network can be a variational auto-encoder that includes an encoder that encodes the generated input data and a decoder that decodes output data to generate the plurality of data predictions. In some embodiments, the training data can be time series data segmented into windows that can be a predetermined number of days, such as a windows size.

At 2504, observed time series data is processed to generate the input data. For example, the observed data can be featurized and windowized.

At 2506, using the trained neural network and the generated input data, a plurality of data predictions for the plurality of periods of time in the future can be generated. In an embodiment, the generated input data can be segmented time series data over a fixed length window of time, and the plurality of periods of time in the future can be segmented time series data over a same fixed length window of time. For example, the fixed length window of time can be a linear sequence of a predetermined number of days.

At 2508, the plurality of predictions can be provided to a reinforcement learning model configured to generate a plurality of predicted outcomes, wherein the reinforcement learning model varies a plurality of parameters to simulate conditions for at least a first entity and a second entity, and an artificial intelligence agent simulates actions performed by one or more of the first entity and second entity, the plurality of data predictions comprising a parameter for the simulation. For example, the first entity can be a merchant, the second entity can be a financial entity that provides or administers a loan to or for the merchant or that purchases invoices from the merchant (e.g., lender and/or factor), and the generated input data and the training data can be transactions for the merchant.

In some embodiments, the generated plurality of data predictions can be predicted balances of an account over a number of days into the future, each of the plurality of predictions corresponding to one of the days in the future. For example, the account can be a lockbox account, and a balance for the lockbox account can be subject to deposits from invoices paid by customers of the merchant, withdrawals from funds provided to the merchant, and withdrawals from funds provided to the factor, lender or other financial entity.

At 2510, parameters for the first and second entities based on the plurality of predicted outcomes can be selected, where the selected parameters correspond to one of the predicted outcomes that meets a selection criteria. In an embodiment, the reinforcement learning model can be a Q-learning model that generates a Q-table of predicted outcomes. For example, parameters defined in one of the rows of the generated Q-table of predicted outcomes can be selected, the selected row including a highest reward function. In an embodiment, the reward function is directly proportional to a predicted amount recovered from the loan provided to the merchant. In an embodiment, the selected parameters include one or more of a loan term, a loan amount, a demand payment frequency, or a demand payment ordinal.

In some implementations, the reinforcement learning model varies the plurality of parameters to simulate conditions for at least the first entity, the second entity, and a third entity, the first entity comprising the merchant, the second entity comprising the factor that purchases invoices from the merchant, and the third entity comprising the lender that provides or administers the loan to or for the merchant. In this example, the parameters can be selected for the first, second, and third entities based on the plurality of predicted outcomes.

Embodiments generate time series data predictions used to determine parameters by a reinforcement learning model. In some embodiments, a learning model, such as a neural network, can be used in combination with a reinforcement learning model to perform machine prediction of time series data that is then utilized to optimize one or more given parameters. For example, a learning model, such as a neural network, can be trained using time series data to generate time series predictions. In some embodiments, the training data can be past time series data that has been observed and the learning model can be trained to predict time series data for the future.

Embodiments can feed this predicted time series data into a reinforcement learning model that has been configured to optimize one or more parameters. For example, the reinforcement learning model can be configured to simulate a plurality of outcomes based on variations to a set of parameters and a defined reward function. The predicted time series data can be an input to the reinforcement learning model, and the agent can iterate over a number of steps with varied parameters to generate predicted outcomes with corresponding reward values.

In some embodiments, the time series data can include transactions for a merchant. For example, a merchant can experience a number of transactions observed over time, such as an invoice billed to a payor from the merchant, payment of such an invoice, a cash advance provided from an entity, such as a factor, to the merchant, repayment of the advance, and the like. In an embodiment, the merchant may be a party to an agreement, such as a lending agreement with a lender and a factor. For example, the agreement can be based on an account, or a lockbox, where the factor manages the release of funds to the lender and/or the merchant from the lockbox. In some embodiments, the lockbox can add funds when a payor of the merchant pays an invoice. Funds can then be released from the lockbox to the merchant when certain obligations to the lender are met, such as satisfying a payment schedule for a loan, and/or once fee or other payment obligations to the factor have been met. In addition, a demand can also be performed that releases funds from the lockbox to the lender when these obligations are not met, such as when a merchant is delinquent on a loan.

In some embodiments, the learning model (e.g., neural network) can be trained using time series data that represents transactions for a given merchant over time and a balance for the lockbox over time. The learning model can then generate predictions for a balance of the lockbox over time, for example based on expected transaction activity for the merchant given the historical transaction data. In some embodiments, the lockbox balance can be predicted on a day by day basis over a defined number of days in the future. In other words, time series data that includes a lockbox balance over a number of days can be predicted.

Embodiments can then feed this predicted daily lockbox balance into the reinforcement learning model, which can be a Q-learning model, or any other suitable reinforcement learning model. The reinforcement learning model can be configured to simulate various conditions for the lending agreement, such as various payment schedules, an amount for the loan, timing for a demand, the likelihood of repayment by the merchant given the other conditions, expected recoupment on the loan by the lender given the other conditions, and the like. The reinforcement learning model can vary one or more of these parameters to optimize an objective, such as a defined reward function. In some embodiments, the reinforcement learning model can iterate through steps of the simulation, taking as input the predicted time series data. The result can generate parameters for the relationship between the parties to the agreement, and parameters can be selected that meet a selection criteria, such as an optimized reward function.

While examples of various components are provided throughout the disclosure, other suitable components may similarly be implemented. For example, the balance predictor model can be implemented by any suitable machine learning model other than a variational auto-encoder, such as a simple neural network. Similarly, the reinforcement learning model/agent/simulator can be achieved by any suitable reinforcement learning model and/or software framework defined by a ruleset.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

We claim:

1. A method for generating future time series data predictions used to determine parameters by a reinforcement learning model, the method comprising:
receiving a trained neural network that is configured to generate a plurality of predictions for a plurality of periods of time in the future based on input data, wherein the neural network is trained using training data that comprises time series data segmented into a plurality of windows;
processing observed time series data to generate the input data;
generating, using the trained neural network and the generated input data, a plurality of data predictions for the plurality of periods of time in the future;
providing the plurality of predictions to a reinforcement learning model configured to generate a plurality of predicted outcomes, wherein the reinforcement learning model varies a plurality of parameters to simulate conditions for at least a first entity and a second entity, and an artificial intelligence agent simulates actions performed by one or more of the first entity and second entity, the plurality of data predictions comprising a parameter for the simulation; and
selecting parameters for the first and second entities based on the plurality of predicted outcomes, wherein the selected parameters correspond to one of the predicted outcomes that meets a selection criteria.

2. The method of claim 1, wherein the trained neural network comprises a variational auto-encoder that includes an encoder that encodes the generated input data and a decoder that decodes output data to generate the plurality of data predictions.

3. The method of claim 1, wherein processing the observed time series data comprises featurizing the observed time series data and windowizing the observed time series data.

4. The method of claim 3, wherein the generated input data comprises segmented time series data over a fixed length window of time, and the plurality of periods of time in the future comprise segmented time series data over a same fixed length window of time.

5. The method of claim 4, wherein the fixed length window of time comprises a linear sequence of a predetermined number of days.

6. The method of claim 5, wherein the generated input data and the training data comprise transactions for a merchant, the first entity comprises the merchant, and the second entity comprises one or more of a lender that provides or administers a loan to or for the merchant, or a factor that purchases invoices from the merchant.

7. The method of claim 6, wherein the generated plurality of data predictions comprise predicted balances of an account over a number of days into the future, each of the plurality of predictions corresponding to one of the days in the future.

8. The method of claim 7, wherein the account comprises a lockbox account, and a balance for the lockbox account is subject to deposits from invoices paid by customers of the merchant, withdrawals from funds provided to the merchant, and withdrawals from funds provided to the lender or factor.

9. The method of claim 8, wherein the reinforcement learning model comprises a Q-learning model that generates a Q-table of predicted outcomes that comprises rows and columns.

10. The method of claim 9, wherein parameters defined in one of the rows of the generated Q-table of predicted outcomes are selected, the selected row comprising a highest reward function value.

11. The method of claim 10, wherein the reward function value is directly proportional to a predicted amount recovered from the loan provided to the merchant.

12. The method of claim 10, wherein the plurality of parameters varied by the reinforcement learning model include one or more of a loan term, a loan amount, a demand payment frequency, or a demand payment ordinal.

13. The method of claim 10, wherein the plurality of parameters varied by the reinforcement learning model include one or more of an aggregate amount of a loan facility, a draw schedule, maximum draw amounts, a timing for a demand, a likelihood of repayment by the merchant given other conditions, and an expected recoupment on the loan by the lender given other conditions.

14. The method of claim 10, wherein,
the reinforcement learning model varies the plurality of parameters to simulate conditions for at least the first entity, the second entity, and a third entity, the first entity comprising the merchant, the second entity comprising the factor that purchases invoices from the merchant, and the third entity comprising the lender that provides or administers the loan to or for the merchant, and
the parameters are selected for the first, second, and third entities based on the plurality of predicted outcomes.

15. A system for generating future time series data predictions used to determine parameters by a reinforcement learning model, the system comprising:
a processor coupled to memory that stores instructions, wherein the processor is configured to:
receive a trained neural network that is configured to generate a plurality of predictions for a plurality of periods of time in the future based on input data, wherein the neural network is trained using training data that comprises time series data segmented into a plurality of windows;
process observed time series data to generate the input data;
generate, using the trained neural network and the generated input data, a plurality of data predictions for the plurality of periods of time in the future;
provide the plurality of predictions to a reinforcement learning model configured to generate a plurality of predicted outcomes, wherein the reinforcement learning model varies a plurality of parameters to simulate conditions for at least a first entity and a second entity, and an artificial intelligence agent simulates actions performed by one or more of the first entity and second entity, the plurality of data predictions comprising a parameter for the simulation; and
select parameters for the first and second entities based on the plurality of predicted outcomes, wherein the selected parameters correspond to one of the predicted outcomes that meets a selection criteria.

16. The system of claim 15, wherein the trained neural network comprises a variational auto-encoder that includes an encoder that encodes the generated input data and a decoder that decodes output data to generate the plurality of data predictions.

17. The system of claim 15, wherein processing the observed time series data comprises featurizing the observed time series data and windowizing the observed time series data.

18. The system of claim 17, wherein the generated input data comprises segmented time series data over a fixed length window of time, and the plurality of periods of time in the future comprise segmented time series data over a same fixed length window of time.

19. The system of claim 18, wherein the fixed length window of time comprises a linear sequence of a predetermined number of days.

20. The system of claim 19, wherein the reinforcement learning model comprises a Q-learning model that generates a Q-table of predicted outcomes that comprises rows and columns.

21. The system of claim 20, wherein parameters defined in one of the rows of the generated Q-table of predicted outcomes are selected, the selected row comprising a highest reward function value.

22. A non-transitory computer readable medium having instructions stored thereon that, when executed by a processor, cause the processor to generate future time series data predictions used to determine parameters by a reinforcement learning model, the instructions causing the process to:
receive a trained neural network that is configured to generate a plurality of predictions for a plurality of periods of time the future based on input data, wherein the neural network is trained using training data that comprises time series data segmented into a plurality of windows;
process observed time series data to generate the input data;
generate, using the trained neural network and the generated input data, a plurality of data predictions for the plurality of periods of time in the future;
provide the plurality of predictions to a reinforcement learning model configured to generate a plurality of predicted outcomes, wherein the reinforcement learning model varies a plurality of parameters to simulate conditions for at least a first entity and a second entity, and an artificial intelligence agent simulates actions performed by one or more of the first entity and second entity, the plurality of data predictions comprising a parameter for the simulation; and
select parameters for the first and second entities based on the plurality of predicted outcomes, wherein the selected parameters correspond to one of the predicted outcomes that meets a selection criteria.

23. The non-transitory computer readable medium of claim 22, wherein the trained neural network comprises a variational auto-encoder that includes an encoder that encodes the generated input data and a decoder that decodes output data to generate the plurality of data predictions.

24. The non-transitory computer readable medium of claim 22, wherein processing the observed time series data comprises featurizing the observed time series data and windowizing the observed time series data.

25. The non-transitory computer readable medium of claim 24, wherein the generated input data comprises segmented time series data over a fixed length window of time, and the plurality of periods of time in the future comprise segmented time series data over a same fixed length window of time.

26. The non-transitory computer readable medium of claim 25, wherein the fixed length window of time comprises a linear sequence of a predetermined number of days.

27. The non-transitory computer readable medium of claim 26, wherein the generated input data and the training data comprise transactions for a merchant, the first entity comprises the merchant, and the second entity comprises one or more of a lender that provides or administers a loan to or for the merchant, or a factor that purchases invoices from the merchant.

28. The non-transitory computer readable medium of claim 27, wherein the reinforcement learning model comprises a Q-learning model that generates a Q-table of predicted outcomes that comprises rows and columns.

29. The non-transitory computer readable medium of claim 28, wherein parameters defined in one of the rows of the generated Q-table of predicted outcomes are selected, the selected row comprising a highest reward function value.

30. The non-transitory computer readable medium of claim 29, wherein the reward function value is directly proportional to a predicted amount recovered from the loan provided to the merchant.

* * * * *